United States Patent
Yamauchi

(10) Patent No.: US 8,368,713 B2
(45) Date of Patent: Feb. 5, 2013

(54) FIGURE DRAWING DEVICE AND METHOD

(75) Inventor: Hideaki Yamauchi, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 600 days.

(21) Appl. No.: 12/557,062

(22) Filed: Sep. 10, 2009

(65) Prior Publication Data
US 2010/0002003 A1 Jan. 7, 2010

Related U.S. Application Data

(63) Continuation of application No. PCT/JP2007/000270, filed on Mar. 20, 2007.

(51) Int. Cl.
*G09G 5/00* (2006.01)
(52) U.S. Cl. ........ 345/581; 345/426; 345/441; 345/582; 345/589; 345/619
(58) Field of Classification Search .................. None
See application file for complete search history.

(56) References Cited

U.S. PATENT DOCUMENTS

| | | | | |
|---|---|---|---|---|
| 5,528,737 A * | 6/1996 | Sfarti | .......................... | 345/441 |
| 5,581,673 A | 12/1996 | Kikuchi | | |
| 2001/0055024 A1* | 12/2001 | Funakubo et al. | ............ | 345/589 |

FOREIGN PATENT DOCUMENTS

| | | | |
|---|---|---|---|
| JP | 07-105390 A | 4/1995 |
| JP | 07-160899 A | 6/1995 |
| JP | 2002-109553 A | 4/2002 |
| JP | 2002-208017 A | 7/2002 |

OTHER PUBLICATIONS

Dave Shreiner, et al., "OpenGL Programming Guide, Version 2 (5th Edition)", OpenGL Architecture Review Board, translated by Koichi Matsuda, Kabushiki Kaisha Person Educaton, Dec. 2006.

* cited by examiner

*Primary Examiner* — Kee M Tung
*Assistant Examiner* — Jwalant Amin
(74) *Attorney, Agent, or Firm* — Arent Fox LLP

(57) ABSTRACT

A figure drawing device includes; a device 2 for increasing/decreasing the number of pixels on a scanning line up to the final painting pixel by one pixel; a device 3 for increasing/decreasing the number of scanning lines for drawing by one line; a device 4 for outputting drawing pixel data based on the control by the devices 1 and 2; a stencil buffer 5 for holding figure data in an intermediate stage of sequentially drawing a figure; a device 6 for holding pixel data read from the buffer 5 and consecutive as plural pieces of pixel data; a device 7 for detecting the transit state of the data value in the device 6; and a device 8 for inverting/non-inverting the logical operation result of the output data of the device 4 and the data in the device 6 and writing a result to the buffer 5.

4 Claims, 49 Drawing Sheets

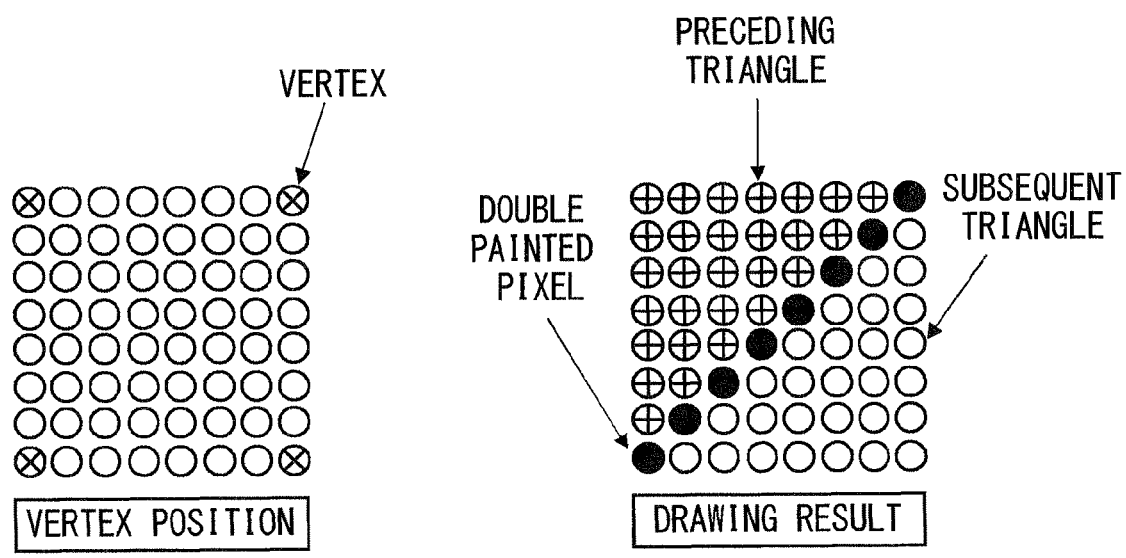
F I G. 1

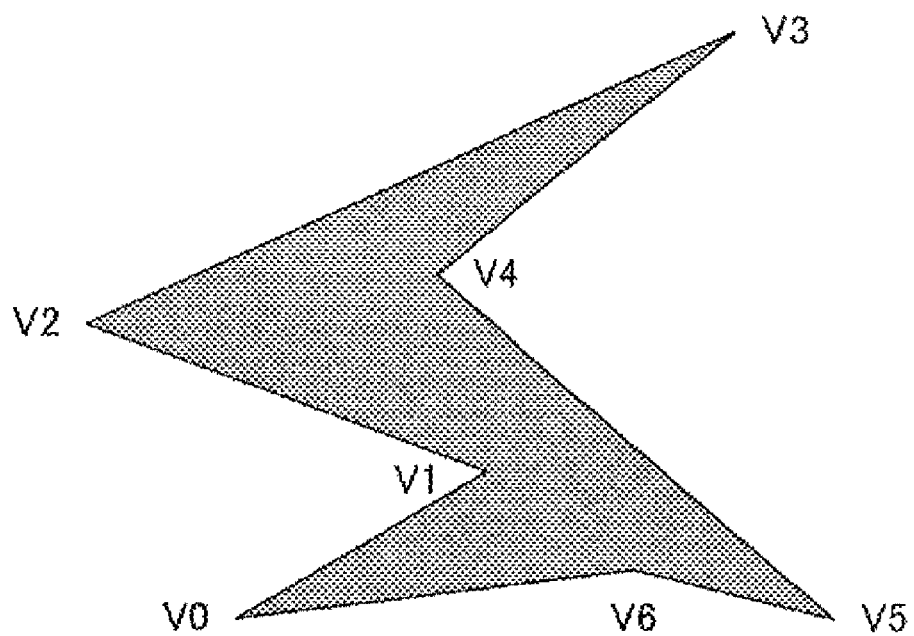
FINAL DRAWN FIGURE
F I G. 4

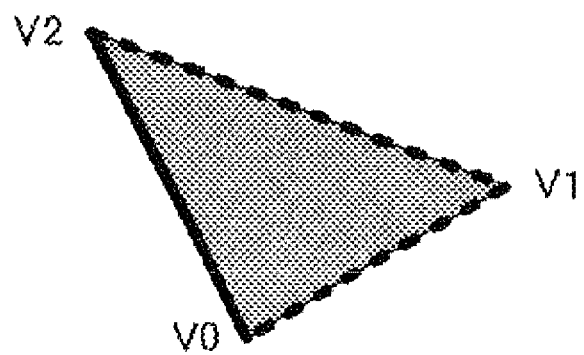
STEP 1
DRAWING (V0-V1-V2)
F I G. 5

STEP 3
DRAWING (V0-V3-V4)

STEP 5
DRAWING (V0-V5-V6)

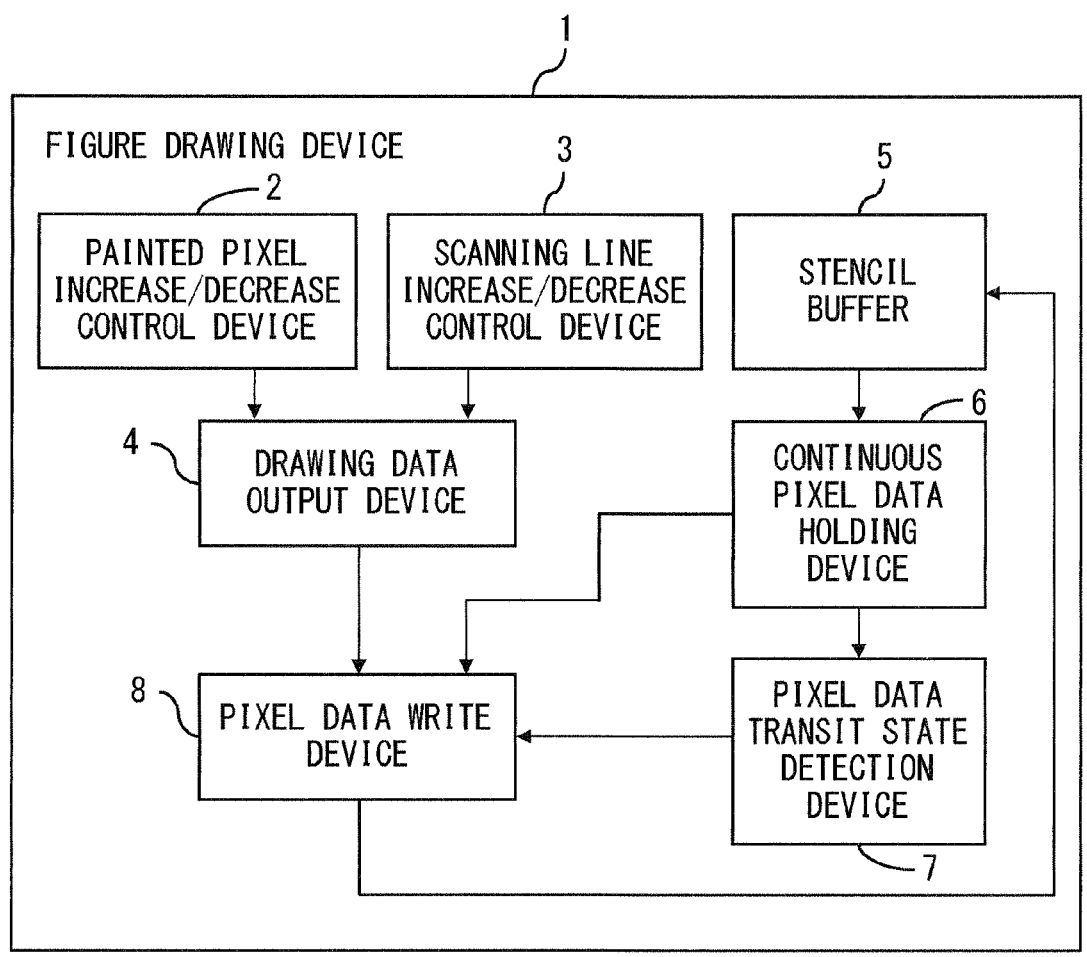
F I G. 1 1

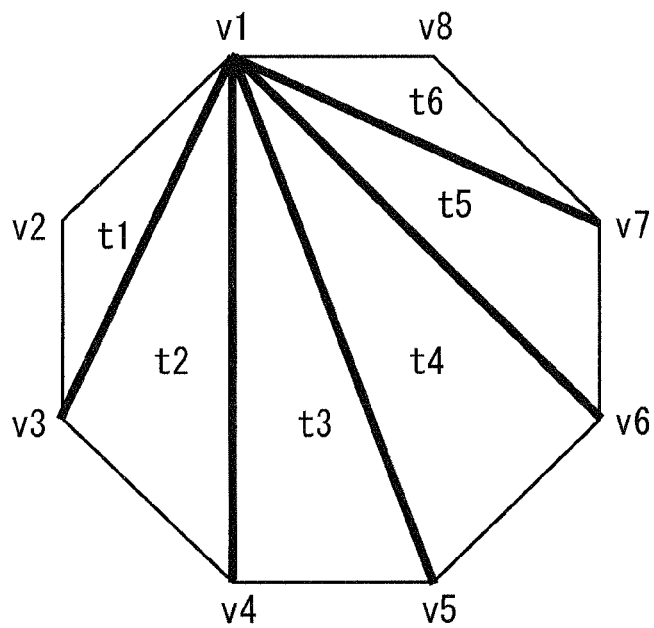
VERTEX DATA : v1, v2, ... , v10
GENERATED TRIANGLE : t1, t2, ... , t8
BOLD LINE EXPRESSION : SIDE HAVING DOUBLE PAINTING RISK
(INNER SIDE)
F I G. 1 7

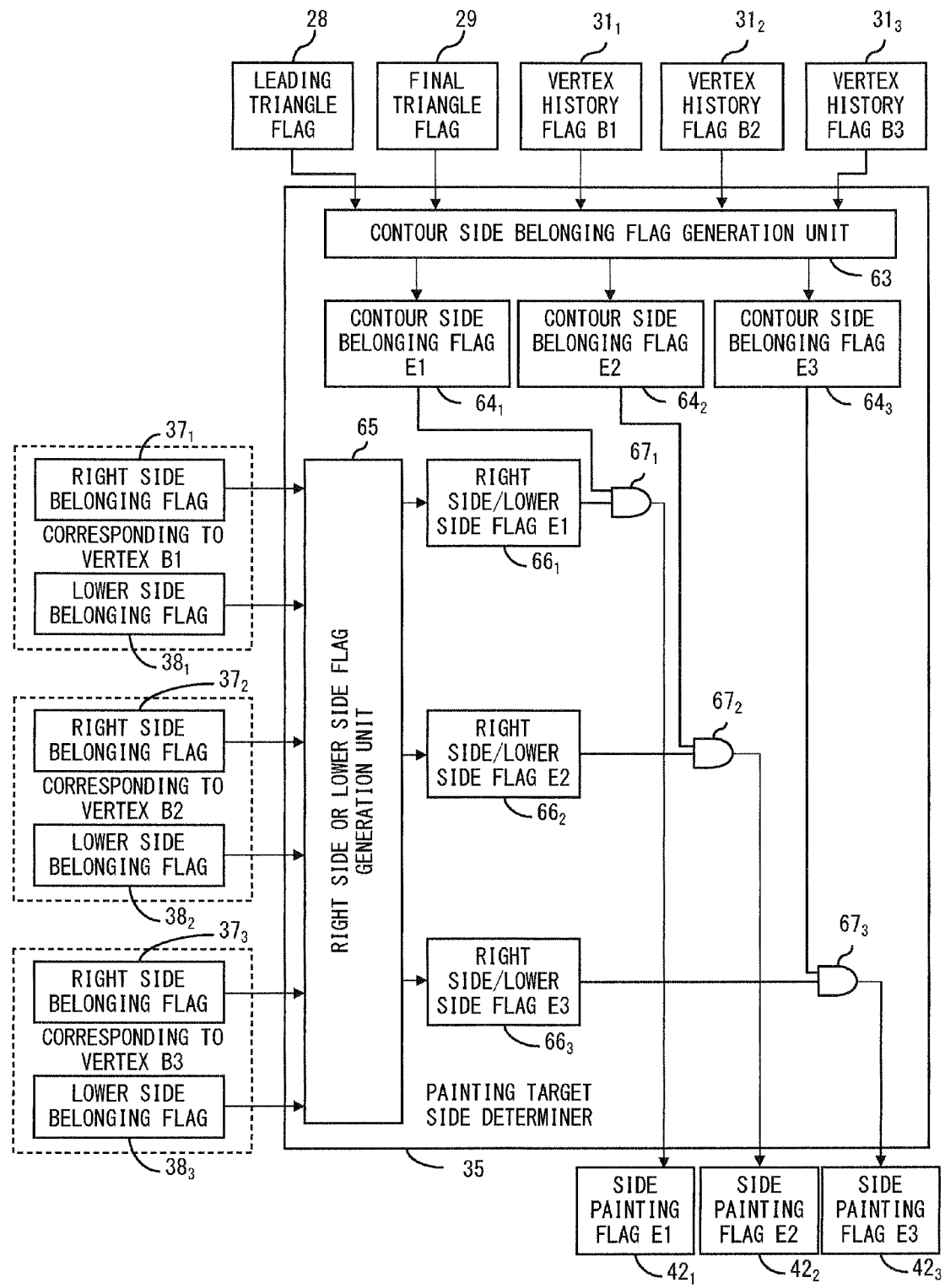
F I G. 2 1

STEP 1
DRAWING (V0-V1-V2)

STEP 2
DRAWING (V0-V2-V3)

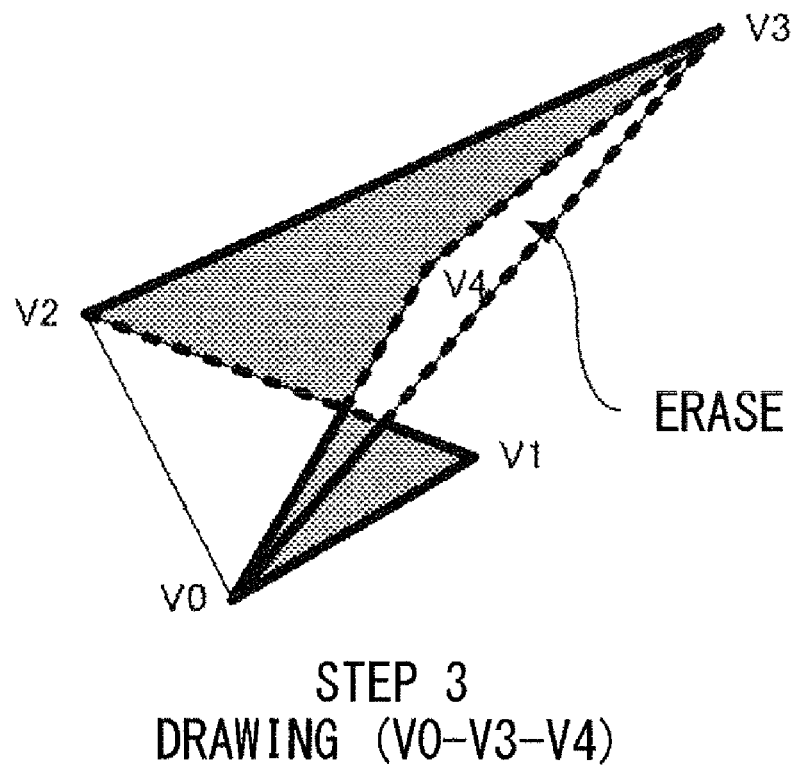
STEP 3
DRAWING (V0-V3-V4)
F I G. 2 7

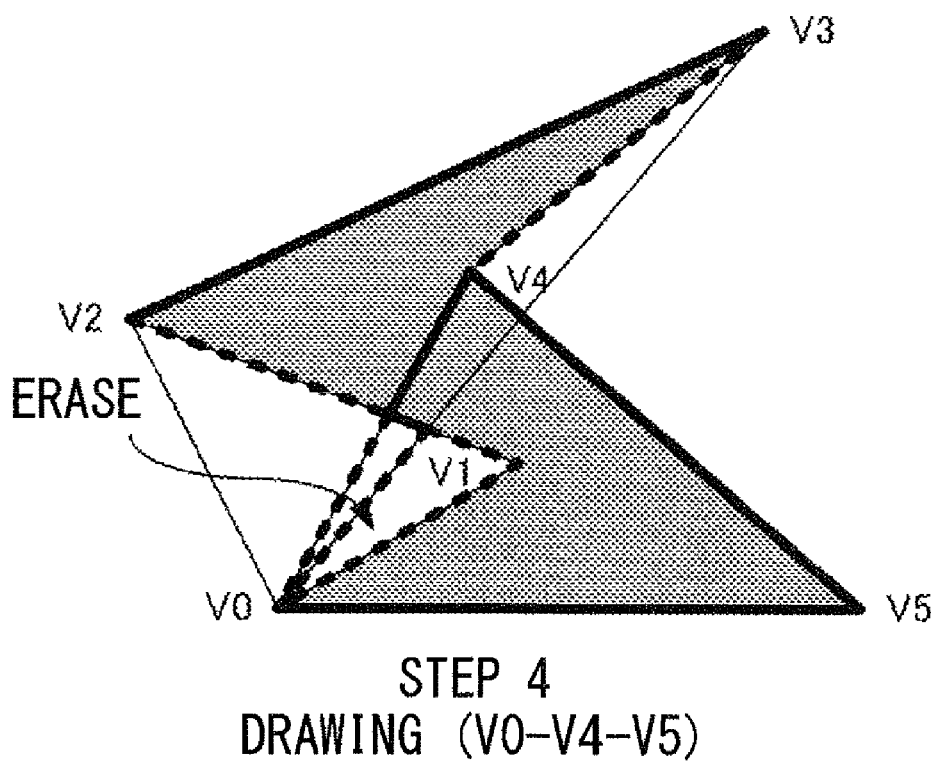
F I G. 2 8

STEP 5
DRAWING (V0-V5-V6)

STEP 1
DRAWING (V0-V1-V2)

STEP 2
DRAWING (V0-V2-V3)

STEP 3
DRAWING (V0-V3-V4)

STEP 4
DRAWING (V0-V4-V5)

STEP 5
DRAWING (V0-V5-V6)

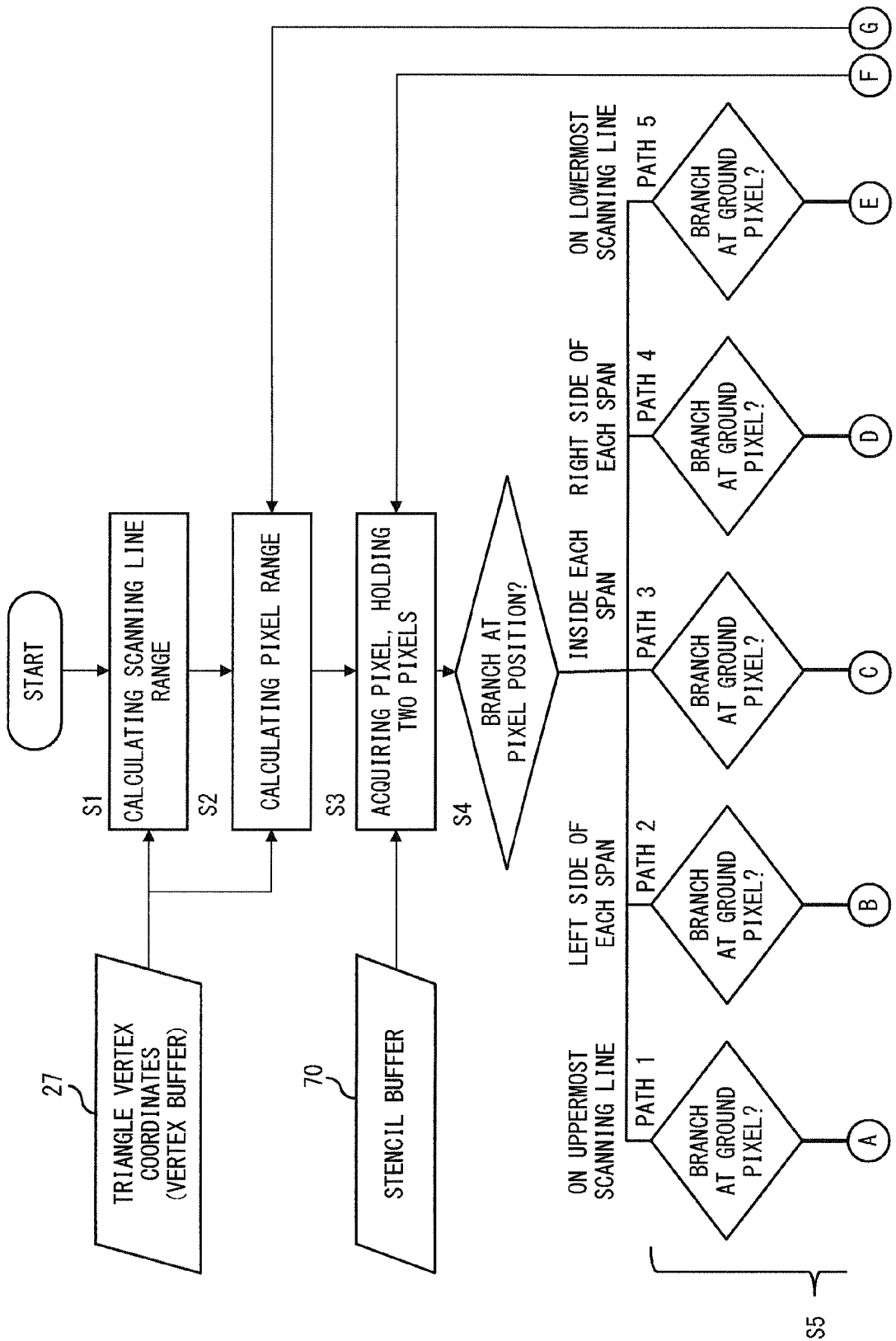
F I G. 36A

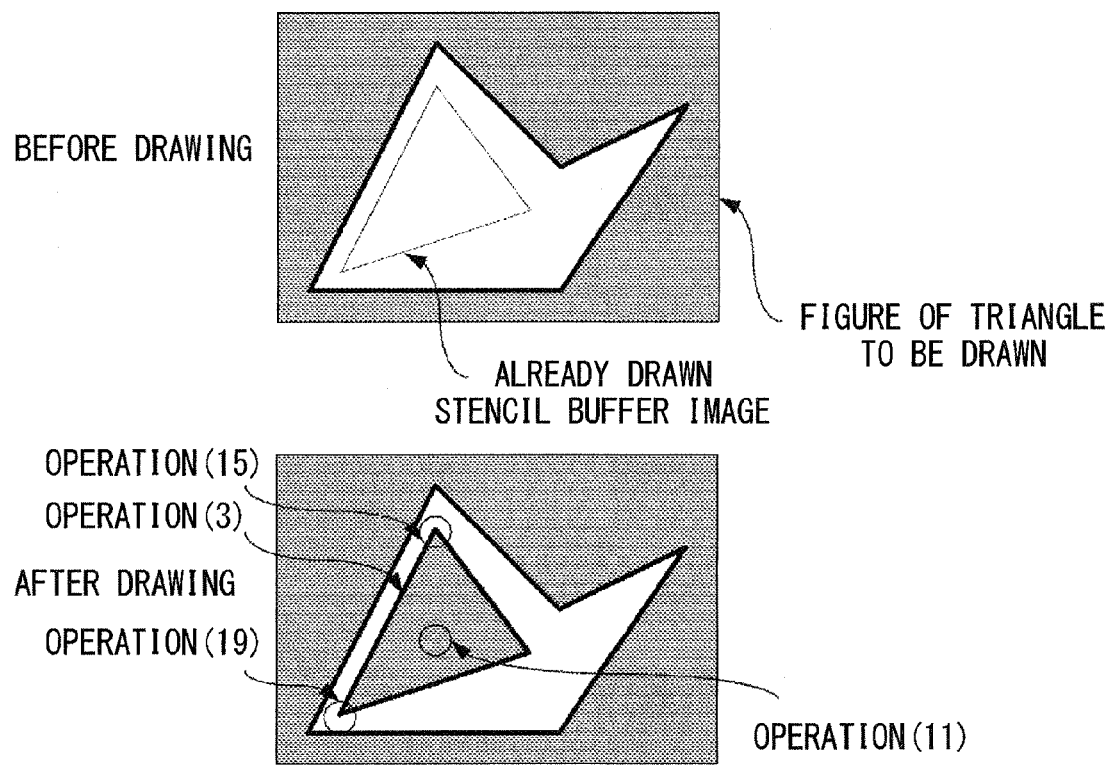
F I G. 40

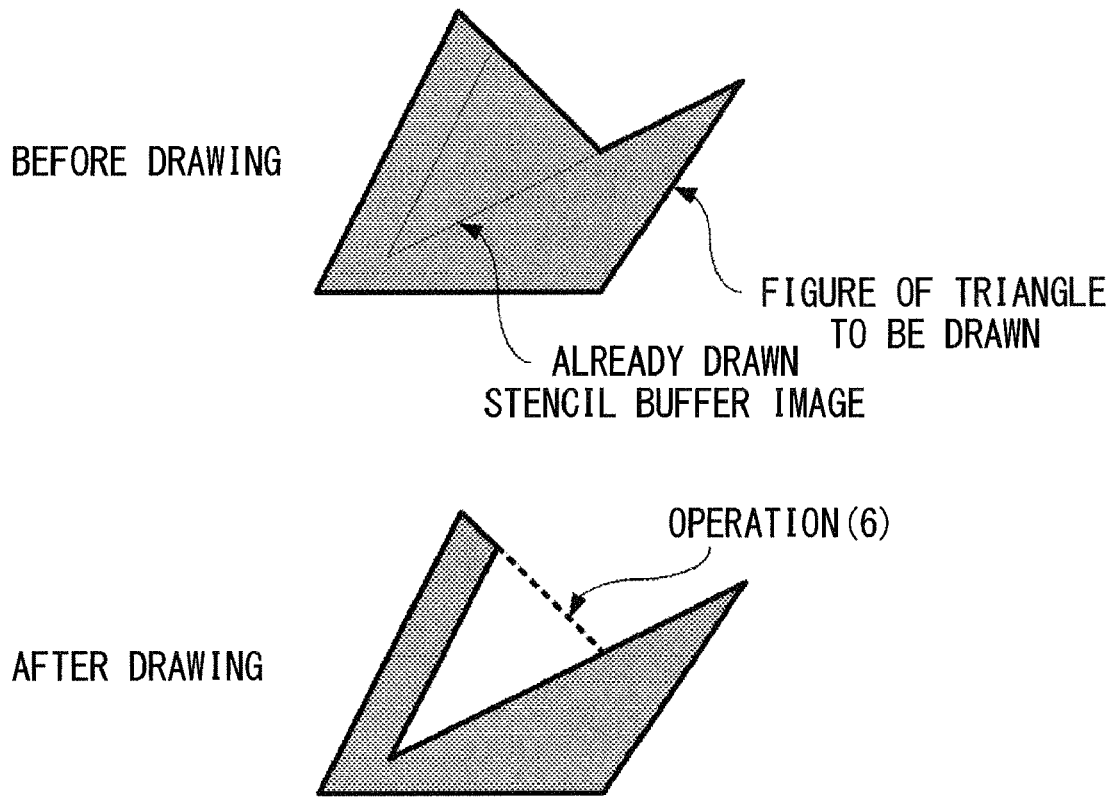
F I G. 4 3

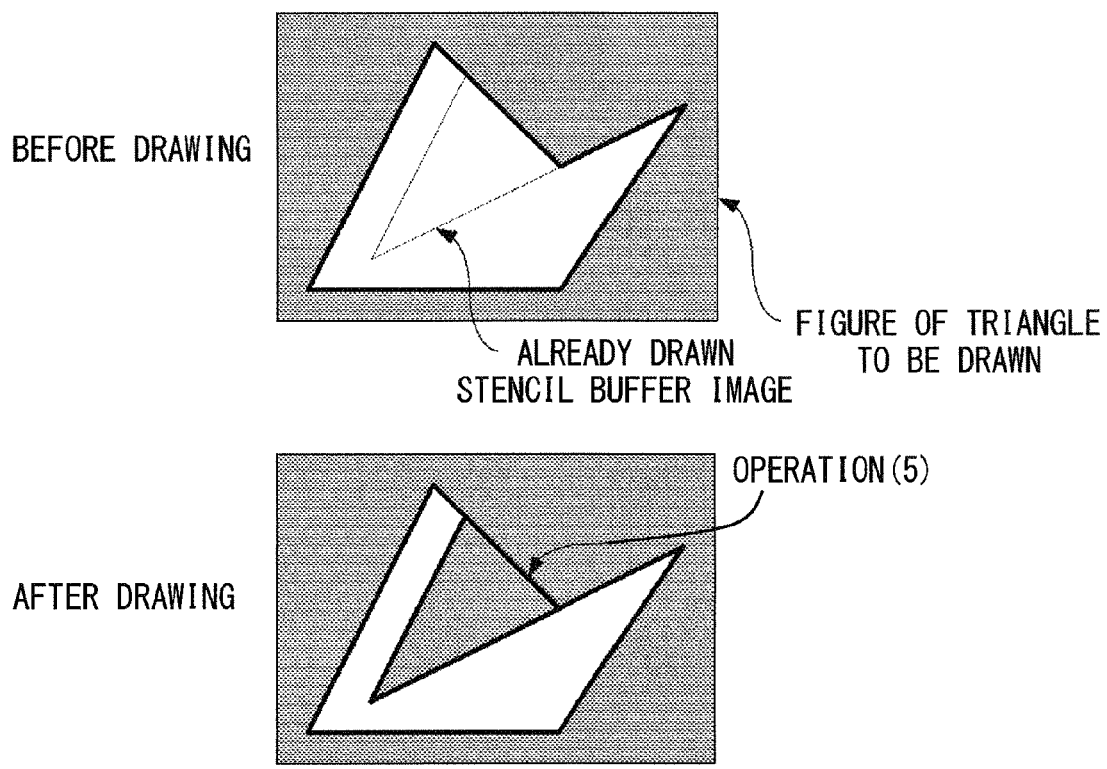
F I G. 4 4

FIG. 45A

| CORRESPONDING FIGURE NUMBER | | | STEP | | | | | RESULT OF PRIOR ART |
|---|---|---|---|---|---|---|---|---|
| | | | S3 | S4 | S5 | S6 | S7 | |
| FIG. 37 OPERATION (1) | PATH | BEFORE BRANCH | PATH 2 | PATH 11 | PATH 26 | | – |
| | DATA | | ↓ | ↓ | ↓ | – | |
| FIG. 38 OPERATION (2) | PATH | BEFORE BRANCH | PATH 2 | PATH 12 | PATH 27 | | 00_0_00 |
| | DATA | 00_1_11 | ↓ | ↓ | ↓ | 00_0_00 | |
| FIG. 40 OPERATION (3) | PATH | BEFORE BRANCH | PATH 2 | PATH 10 | PATH 27 | | 11_0_11 |
| | DATA | 11_1_00 | ↓ | ↓ | ↓ | 11_1_11 | |
| FIG. 39 OPERATION (4) | PATH | BEFORE BRANCH | PATH 2 | PATH 13 | PATH 26 | | 00_1_11 |
| | DATA | 00_0_00 | ↓ | ↓ | ↓ | 00_1_11 | |
| FIG. 44 OPERATION (5) | PATH | BEFORE BRANCH | PATH 4 | PATH 19 | PATH 27 | | 11_0_00 |
| | DATA | 11_1_11 | ↓ | ↓ | ↓ | 11_1_00 | |
| FIG. 43 OPERATION (6) | PATH | BEFORE BRANCH | PATH 4 | PATH 20 | PATH 28 | | 11_1_11 |
| | DATA | 00_1_11 | ↓ | ↓ | ↓ | 11_1_11 | |
| FIG. 42 OPERATION (7) | PATH | BEFORE BRANCH | PATH 4 | PATH 18 | PATH 26 | | 00_0_00 |
| | DATA | 11_1_00 | ↓ | ↓ | ↓ | 00_0_00 | |
| FIG. 41 OPERATION (8) | PATH | BEFORE BRANCH | PATH 4 | PATH 21 | PATH 26 | | 11_0_00 |
| | DATA | 00_0_00 | ↓ | ↓ | ↓ | 11_1_00 | |
| FIG. 41 OPERATION (9) | PATH | BEFORE BRANCH | PATH 3 | PATH 15 | PATH 28 | | 00_1_11 |
| | DATA | 11_1_11 | ↓ | ↓ | ↓ | 00_1_11 | |
| FIG. 42 OPERATION (10) | PATH | BEFORE BRANCH | PATH 3 | PATH 16 | PATH 27 | | 11_0_00 |
| | DATA | 00_1_11 | ↓ | ↓ | ↓ | 11_1_00 | |
| FIG. 40 OPERATION (11) | PATH | BEFORE BRANCH | PATH 3 | PATH 14 | PATH 28 | | 00_1_11 |
| | DATA | 11_1_00 | ↓ | ↓ | ↓ | 00_1_11 | |
| FIG. 42 OPERATION (12) | PATH | BEFORE BRANCH | | | PATH 26 | | 00_0_11 |
| | DATA | 00_0_00 | | | | | |
| FIG. 40 OPERATION (13) | PATH | BEFORE BRANCH | | | | | 11_1_11 |
| | DATA | | | | | 11_1_11 | |

| CORRESPONDING FIGURE NUMBER | | | STEP | | | | RESULT OF PRIOR ART |
|---|---|---|---|---|---|---|---|
| | | S3 | S4 | S5 | S6 | S7 | |
| FIG. 39 OPERATION (12) | PATH | BEFORE BRANCH | PATH 3 | PATH 17 | PATH 26 | – | – |
| | DATA | 11_1_11 | ↓ | ↓ | ↓ | 00_0_00 | 00_0_00 |
| FIG. 37 OPERATION (13) | PATH | BEFORE BRANCH | PATH 1 | PATH 7 | PATH 29 | – | – |
| | DATA | 00_1_11 | ↓ | ↓ | ↓ | 00_1_11 | 00_0_11 |
| FIG. 38 OPERATION (14) | PATH | BEFORE BRANCH | PATH 1 | PATH 8 | PATH 29 | – | – |
| | DATA | 11_1_00 | ↓ | ↓ | ↓ | 11_1_00 | 11_0_00 |
| FIG. 40 OPERATION (15) | PATH | BEFORE BRANCH | PATH 1 | PATH 6 | PATH 26 | – | – |
| | DATA | 00_0_00 | ↓ | ↓ | ↓ | 00_1_00 | 00_1_00 |
| FIG. 39 OPERATION (16) | PATH | BEFORE BRANCH | PATH 1 | PATH 9 | PATH 29 | – | – |
| | DATA | 11_1_11 | ↓ | ↓ | ↓ | 11_1_11 | 11_0_11 |
| FIG. 37 OPERATION (17) | PATH | BEFORE BRANCH | PATH 5 | PATH 23 | PATH 29 | – | – |
| | DATA | 00_1_11 | ↓ | ↓ | ↓ | 00_1_11 | 00_0_11 |
| FIG. 38 OPERATION (18) | PATH | BEFORE BRANCH | PATH 5 | PATH 24 | PATH 29 | – | – |
| | DATA | 11_1_00 | ↓ | ↓ | ↓ | 11_1_00 | 11_0_00 |
| FIG. 40 OPERATION (19) | PATH | BEFORE BRANCH | PATH 5 | PATH 22 | PATH 26 | – | – |
| | DATA | 00_0_00 | ↓ | ↓ | ↓ | 00_1_00 | 00_0_00 |
| FIG. 39 OPERATION (20) | PATH | BEFORE BRANCH | PATH 5 | PATH 25 | PATH 29 | – | – |
| | DATA | 11_1_11 | ↓ | ↓ | ↓ | 11_1_11 | 11_1_11 |

READING DATA FROM STENCIL BUFFER →     WRITE BACK DATA TO STENCIL BUFFER

F I G. 45 B

FIGURE DRAWING DEVICE AND METHOD

CROSS-REFERENCE TO RELATED APPLICATION

This application is a continuation application of the prior International Patent Application No. PCT/JP2007/000270, filed on Mar. 20, 2007, the entire contents of which are incorporated herein by reference.

FIELD

The present invention relates to a figure drawing system using computer graphics, and more specifically to a figure drawing device for preventing double drawing the sides of adjacent figures and drawing an arbitrary closed polygon including a concave portion while preventing double drawing.

BACKGROUND

When a figure is drawn using a graphic system, a figure to be drawn is generally divided into a group of triangles, and pixels configuring the figure are painted. FIG. 1 is an explanatory view of a result of drawing in the above-mentioned drawing system. In FIG. 1, a substantially square figure is divided into two figures, that is, an upper left triangle and a lower right triangle. First, the pixels configuring the upper left triangle, that is, the preceding triangle, are painted, and then the pixels configuring the lower right triangle, that is, the subsequent triangle, are painted. However, in this case, the side as the boundary of the two triangles is shared. That is, the pixels configuring the side are double painted. For example, when a semitransparent figure is drawn, the color of the side is unfortunately deep.

FIG. 2 is an explanatory view of a common conventional system for preventing the above-mentioned problem. Generally, in the first conventional system, the rightmost side and the lowermost side of a triangle (in this example, referred to as end sides) are not painted, that is, paint prohibited, thereby preventing the double painting. Namely, in FIG. 2, the pixels configuring the rightmost side of the preceding triangle, that is, the side of the boundary of the two triangles, are painted when the preceding triangle is drawn, that is, the drawing is prohibited. The side can be protected against the double painting by painting the side when the subsequent triangle is drawn. However, in the system illustrated in FIG. 2, the drawing of the rightmost side and the lowermost side is inhibited, and the end sides are not painted, thereby generating an image not matching the image to be drawn.

FIG. 3 is an explanatory view of the second prior art of the system of inhibiting double painting of a shared side. In this conventional system, the contour line of each triangle is traced after drawing each triangle in the system illustrated in FIG. 2, thereby solving especially the problem of not painting the rightmost side and the lowermost side. That is, after drawing the preceding triangle, the contour line of the triangle is traced by lines including the draw inhibit pixels, and the pixels of the rightmost side and the lowermost side are traced by the contour line after drawing the subsequent triangle, thereby correctly drawing a figure to be drawn.

However, since the contour line is partially double painted in this method, the method cannot be applied to a semitransparent figure, and it is necessary to fine-tune the position of the vertex of contour lines by drawing a bold contour line to avoid the space made between a triangle and an contour line by different algorithms between drawing the triangle and drawing the line, arithmetic errors, etc. There is also the problem that tracing a contour line after drawing a triangle reduces the efficiency in accessing memory storing drawing data, and degrades the performance.

FIGS. 4 through 9 are explanatory views of the problems with the first conventional system illustrated in FIG. 2, that is, the system of not painting the rightmost side and the lowermost side, used when drawing an arbitrary closed polygon including a concave portion.

There are two common methods of drawing the above-mentioned closed polygons. The first method is to draw a figure by dividing a figure into a number of triangles not overlap one another while recursively retrieving coordinates of all vertexes configuring a closed polygon. However, it is hard to realize this method by hardware, and the method cannot be applied to a system of drawing a figure using a graphics LSI.

The second method is to receive the vertexes configuring a closed polygon as streaming data (the processes of the system is performed without knowing the final figure to be drawn), sequentially generate a triangle using input vertexes, and sequentially draw the triangle. Until a final triangle is drawn, the data of a result of drawing in progress is stored in a stencil buffer, and mapped with color information in a frame buffer after drawing a final triangle. When data is stored in a stencil buffer, an exclusive logical sum operation is performed between the data of the pixels drawn and stored in the stencil buffer and the data of the pixels configuring the triangle to be drawn, and the result is written back to the stencil buffer. This method is generally used in a graphics LSI.

FIG. 4 illustrates the shape of a closed polygon to be finally drawn. In accordance with the shape, the graphics system is provided with streaming vertex data in the order of V1, V2, V3, V4, V5, and V6 starting with the vertex V0. The black (square) portion refers to painted pixels and the white (square) portion refers to unpainted pixels.

FIG. 5 illustrates a drawing state of a triangle configured by three vertexes V0, V1, and V2 input first. The pixels of the rightmost sides, that is, the sides V0-V1 and V1-V2 are not painted. The bold solid line refers to a painted contour, and the bold broken line refers to an unpainted (erased) contour.

FIG. 6 illustrates the state in step 2 in which a triangle having three vertexes V0, V2, and V3 is drawn using the data of the next input vertex V3. In FIG. 6, in the portion overlapping the triangle drawn in step 1, the pixel data is "0" by the above-mentioned exclusive logical sum operation for erasure by painting. The pixel on the side V0-V2 of the triangle is also erased by the exclusive logical sum operation.

FIG. 7 illustrates the state in which the triangle V0-V3-V4 is drawn using the data of the vertex V4 input next. That is, in step 3, a triangle is configured using the first vertex V0 in the vertex data input as a stream, the vertex V4 input latest, and the vertex 3 input immediately before the vertex V4. In FIG. 7, the data for a number of pixels in the pixels of the newly drawn triangle is set to "0" by the exclusive logical sum operation, thereby entering the erased state.

FIG. 8 illustrates the state in which the triangle V0-V4-V5 is drawn using the next input data of the vertex V5. In the shapes drawn in FIG. 7, the pixels configuring the triangle whose lower side is painted are erased.

FIG. 9 illustrates the state in which the triangle V0-V5-V6 is drawn after finally inputting the data of the vertex V6. In the final drawing state, as compared with FIG. 4 illustrating the final state of the figure to be drawn, the sides V3-V4, V4-V5, and V0-V6 are erased in the contour of the closed polygon.

The problems with the prior art are described above in detail, but the conventional technology relating to the figure drawing system can be the patent documents 1 through 3, and the non-patent document 1. The patent document 1 discloses the perimeter line drawing data control system capable of simplifying the process of perimeter line data of a triangle by receiving the vertex coordinates as the data of the divisional triangles and an identification flag indicating a boundary line or a division line when a polygon is drawn by dividing it into a plurality of triangles, processing the perimeter line of each triangle on the basis of the identification flag, and drawing a figure.

The patent document 2 discloses a polygon dividing and drawing method and device capable of speeding up the drawing process and simplifying the system by simultaneously drawing a perimeter line when a divisional triangle is drawn by outputting in a simple control system the vertex information of a plurality of triangles generated by dividing a polygon.

The patent document 3 discloses a drawing device for realizing a painting process and a clipping process by a hardware configuration by providing in parallel a counter circuit for counting the number of clip vectors in each direction, a counter circuit for counting the number of draw vector in each direction, and a determining circuit for determining whether the coordinates refer to a starting point or an ending point in the painting region.

However, in the above-mentioned conventional technology, the problem that an end side cannot be painted by avoiding painting the pixels of the rightmost side and the lowermost side of divisional triangles, or the problem that the contour line of a figure is over-erased when an arbitrary closed polygon including a concave portion is drawn cannot be solved.

The non-patent document 1 describes drawing only once the perimeter and the vertex of a polygon and preventing double drawing, but the description of the method is simple, and it is hard to apply the method to preventing a contour line from being over-erased.

Patent Document 1: Japanese Laid-open Patent Publication No. 7-105390 "Perimeter Line Drawing Data Control System"

Patent Document 2: Japanese Laid-open Patent Publication No. 7-160899 "Polygon Dividing And Drawing Method And Device"

Patent Document 3: Japanese Laid-open Patent Publication No. 2002-208017 "Drawing Device"

Non-patent Document 1: "Open GL Programming Guide Version 2", Open GL Developing Committee, translated by Koichi Matsuda, (KK) Pearson Education (December 2006)

SUMMARY

The figure drawing device according to the present invention draws a figure by painting a pixel on a scanning line, and includes at least a painted pixel increase/decrease control device, a scanning line increase/decrease control device, and a drawing data output device.

The painted pixel increase/decrease control device increases/decreases the final painting pixel on the scanning line by one pixel, and performs control whether or not the painting is to be performed on the pixel of, for example, the right side of a triangle as a final pixel when pixels of a figure to be drawn are painted from the left side on one scanning line.

The scanning line increase/decrease control device increases/decreases a scanning line for drawing a figure by one scanning line, and performs control by increasing/decreasing a scanning line by one line depending on whether or not a side that is a lower side of a triangle as a figure to be drawn and is parallel to the scanning line is to be painted.

The drawing data output device outputs pixel data for figure drawing, that is, pixel data generally for pixel painting, on the basis of the control of the painted pixel increase/decrease control device and the scanning line increase/decrease control device.

In addition to the painted pixel increase/decrease control device, the scanning line increase/decrease control device, and the drawing data output device, the figure drawing device according to the present invention further includes a stencil buffer, a continuous pixel data holding device, a pixel data transit state detection device, and a pixel data write device.

The stencil buffer holds pixel data of a figure already drawn when the process of drawing a triangle is repeated to draw a closed polygon including, for example, a concave portion. The continuous pixel data holding device temporarily stores pixel data of a plurality of pixels, for example, two pixels, consecutive on a scanning line and read from the stencil buffer. It can be, for example, a shift register.

The pixel data transit state detection device detects the transit state of pixel data between "1" indicating the painted state of plural pieces of pixel data held in the continuous pixel data holding device, and "0" indicating the unpainted (erased) state.

The pixel data write device performs a logical operation of the pixel data output by the drawing data output device for drawing a figure different from the figure stored in the stencil buffer and the pixel data held in the continuous pixel data holding device, performs inversion/non-inversion on the result of the logical operation depending on the transit state of the data detected by the pixel data transit state detection device, and writes back the inversion/non-inversion result to the stencil buffer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

BRIEF DESCRIPTION OF DRAWINGS

FIG. 1 is an explanatory view of the problem of double painting of a shared side in the prior art;

FIG. 4 is an example of a closed polygon including a concave portion;

FIG. 5 is an explanatory view of the drawing step 1 of the closed polygon illustrated in FIG. 4;

FIG. 11 is a block diagram of the configuration according to the principle of the figure drawing device (2) of the present invention;

FIG. 17 is an explanatory view of a triangle fan as another example of a figure to be drawn in the first embodiment of the present invention;

FIG. 21 is a block diagram of the basic configuration of a determiner of a side to be painted illustrated in FIG. 19;

FIG. 27 is an explanatory view of step 3;

FIG. 28 is an explanatory view of step 4;

FIGS. 36A and 36B are detailed flowcharts of the stencil buffer updating process in each step of drawing a closed polygon in the second embodiment of the present invention;

FIG. 40 is an explanatory view of a new triangle drawing process (4);

FIG. 43 is an explanatory view of a new triangle drawing process (7);

FIG. 44 is an explanatory view of a new triangle drawing process (8); and

FIGS. 45A and 45B are an explanatory views of updating stencil buffer image data in the drawing process illustrated in FIGS. 37 through 44 and a process path in the process flowchart illustrated in FIGS. 36A and 36 B.

DESCRIPTION OF EMBODIMENTS

Figure 10:
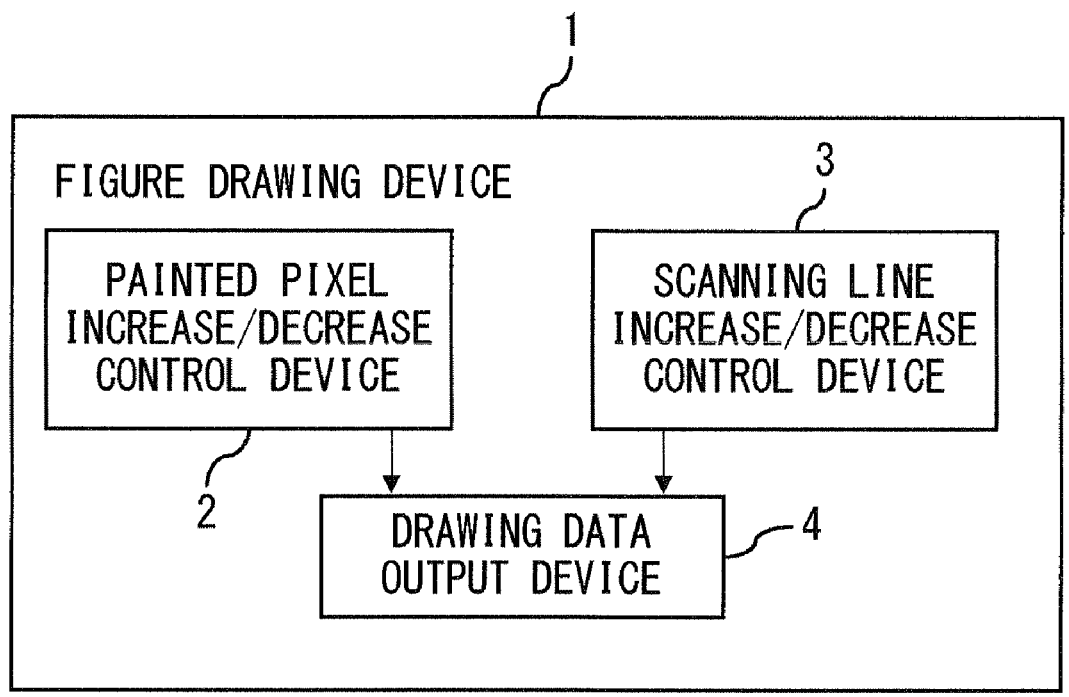
FIG. 10 is a block diagram of the configuration according to the principle of the figure drawing device (1) of the present invention.

FIGS. 10 and 11 are block diagrams of the configuration according to the principle of the figure drawing device of the present invention. FIG. 10 is a block diagram of the configuration according to the principle of the figure drawing device corresponding to the first embodiment described later. FIG. 11 is a block diagram of the configuration according to the principle of the figure drawing device corresponding to the second embodiment.

In FIG. 10, a figure drawing device 1 includes a painted pixel increase/decrease control device 2, a scanning line increase/decrease control device 3, and a drawing data output device 4. The painted pixel increase/decrease control device 2 increases/decreases by one pixel the final painting pixel on the scanning line for drawing a figure, and can be, for example, a pixel counter ending value selector for increases/decreases by one pixel the pixel counter ending value on a scanning line corresponding to the storage contents of a painting mode switch register described later.

The scanning line increase/decrease control device 3 can be, for example, a scanning line counter ending value selector for providing the number m of the scanning lines output by a scanning line range calculator for calculating the number of scanning lines as is or as decreased by one line for drawing a triangle on the basis of the vertex coordinates of the triangle.

The drawing data output device 4 outputs pixel data for drawing a figure, for example, painted data on the basis of the painted pixel increase/decrease control device 2 and the scanning line increase/decrease control device 3, and can be, for example, a span drawer.

In the present embodiment, the figure drawing device 1 can further include a painting target side determination device. That is, when the figure drawing device 1 draws a figure to be drawn by dividing it into triangles, the painting target side determination device can determine which sides of the triangles are to be newly painted, and control the increase/decrease of the pixels to be painted and the increase/decrease of the scanning lines depending on the determination result.

In FIG. 11 corresponding to the second embodiment described later, the figure drawing device 1 includes a stencil buffer 5, a continuous pixel data holding device 6, a pixel data transit state detection device 7, and a pixel data write device 8 in addition to the painted pixel increase/decrease control device 2, the scanning line increase/decrease control device 3, and the drawing data output device 4 illustrated in FIG. 10.

The stencil buffer 5 stores a result of a drawn figure each time triangles are sequentially drawn in drawing a closed polygon including, for example, a concave portion, and the continuous pixel data holding device 6 temporarily holds pixel data of a plurality of pixels continuous on a scanning line for figure drawing, and can be a shift register configured by a plurality of flip-flops (FFs).

The pixel data transit state detection device 7 detect the transit state of data between the painted state of pixel data of a plurality of pixels stored in the continuous pixel data holding device 6, for example, two pixels, that is, the pixel data "1", and the unpainted (erased) state, that is, the pixel data "0", and can be, for example, a painting transit detector.

The pixel data write device 8 performs a logical operation on the pixel data output by the drawing data output device 4, for example, a span drawer, for drawing a new figure, and the pixel data held by the continuous pixel data holding device 6, and writes back to the stencil buffer 5 the resultant data as is or the data inverted from the result of the logical operation depending on the transit state of the pixel data detected by the pixel data transit state detection device 7. Basically, it corresponds to, for example, a logical unit, a pixel drawing effecter, a pixel inversion boundary phase selector, and a pixel inversion boundary control unit.

Figure 12:
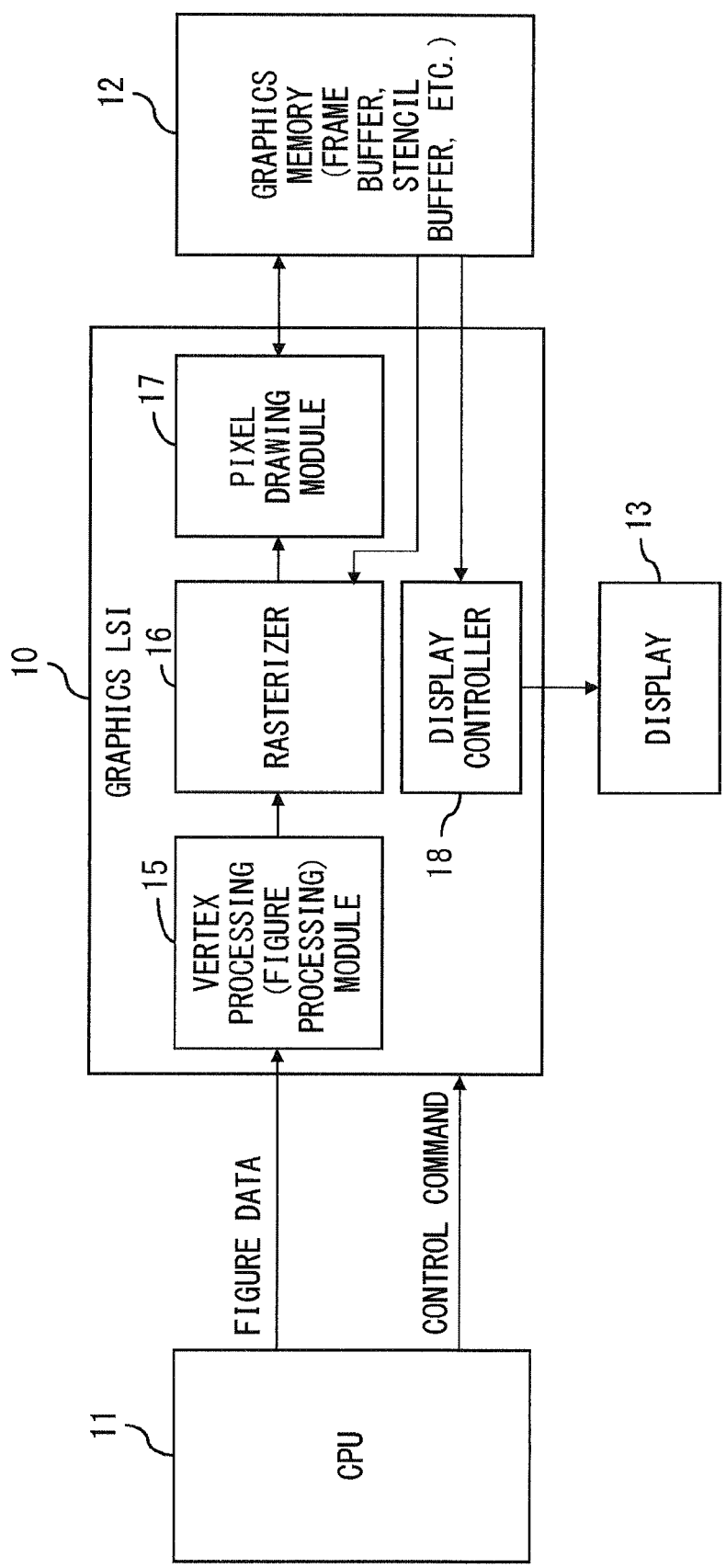
FIG. 12 is a block diagram of the basic configuration of the figure drawing device according to an embodiment of the present invention.

FIG. 12 is a block diagram of the basic configuration of the figure drawing device according to an embodiment of the present invention. In FIG. 12, the figure drawing device is configured by a graphics LSI 10, and a CPU 11, a graphics memory 12, and a display 13 connected to the graphics LSI 10. The CPU 11 provides the graphics LSI 10 with a control command and figure data. The graphics LSI 10 and the graphics memory 12 communicate input/output pixel data as necessary. The graphics LSI 10 outputs image data to the display 13.

The graphics LSI 10 includes a vertex processing (figure processing) module 15, a rasterizer 16, a pixel drawing module 17, and a display controller 18. The vertex processing (figure processing) module 15 determines a side to be painted and a side not to be painted in the sides of divisional triangles. The rasterizer 16 determines whether or not each pixel is to be painted. The pixel drawing module 17 outputs pixel data for actually drawing a figure to the graphics memory 12. In the second embodiment described later, pixel data is read during the drawing process from the stencil buffer as the graphics memory 12, and is provided for the rasterizer 16 for example. Furthermore, the image data read from, for example, a frame buffer as graphics memory is provided for the display 13 through the display controller 18 to display a figure image.

Figure 2:
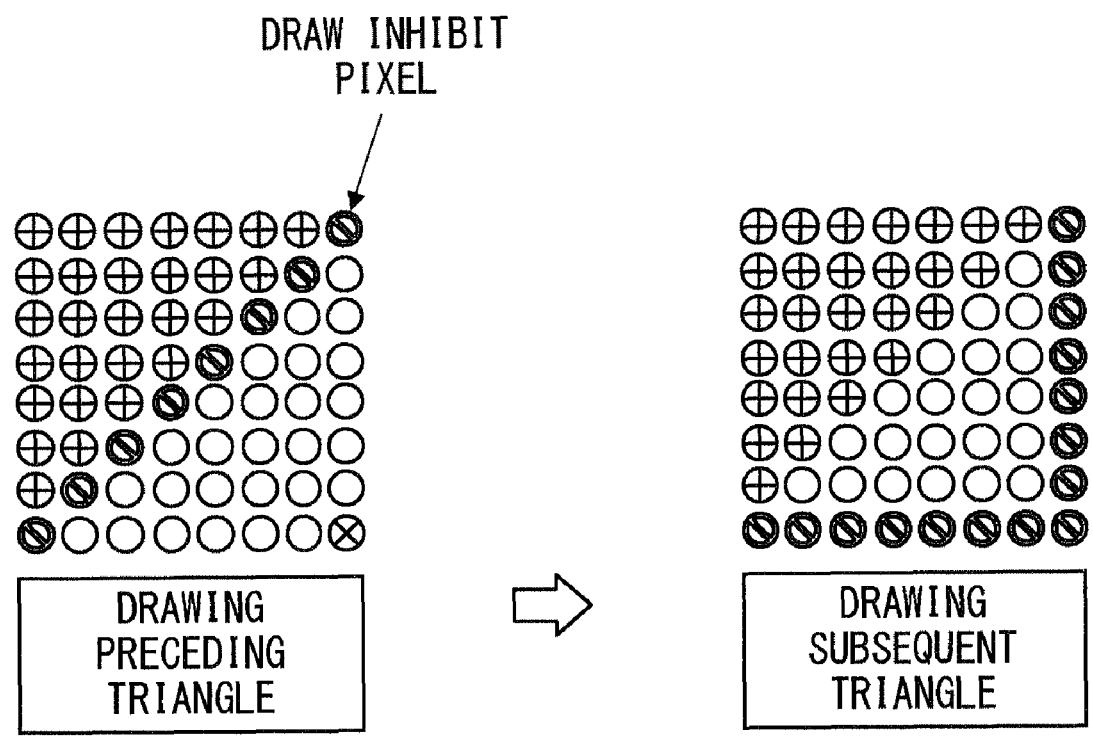
FIG. 2 is an explanatory view of common double paint protection method in the prior art.
Figure 13:
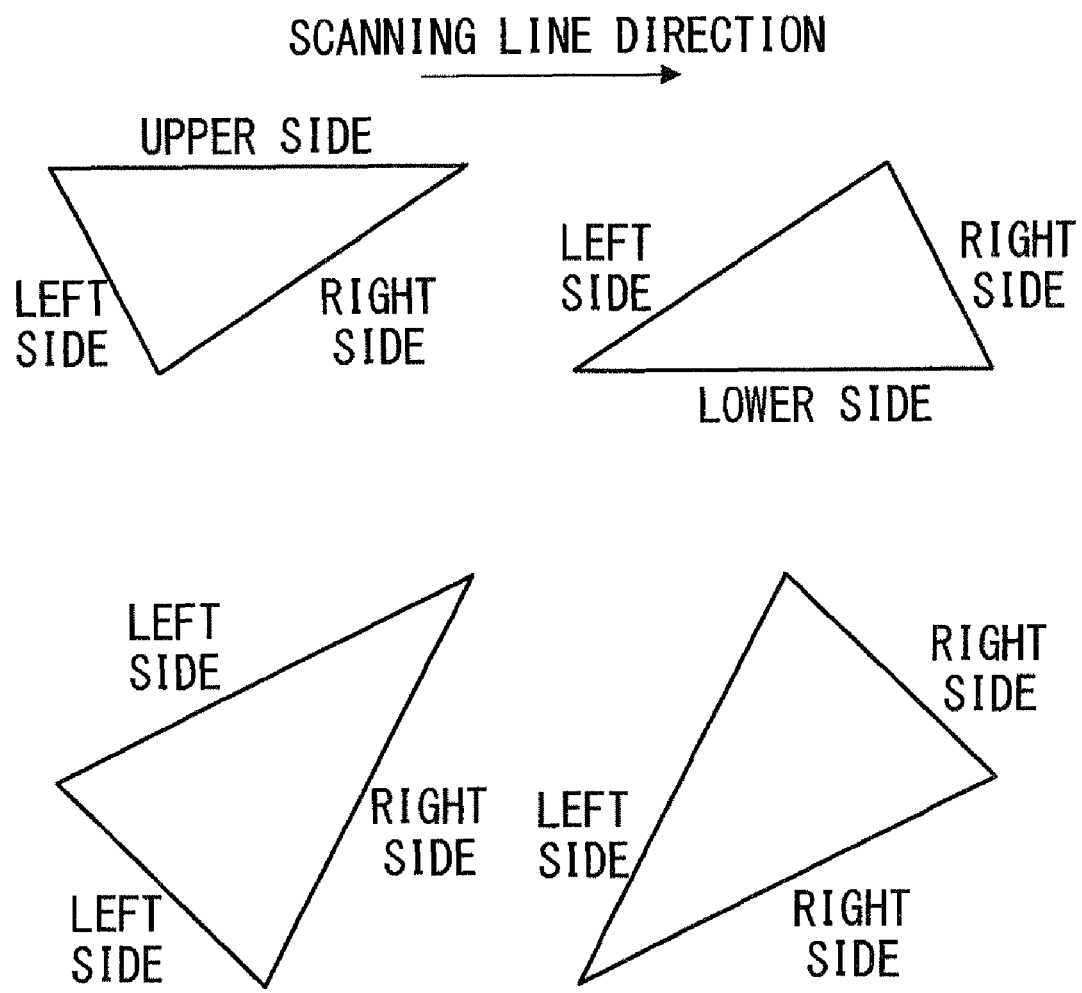
FIG. 13 is an explanatory view of names of the sides of a triangle according to an embodiment of the present invention.

In the description of the prior art illustrated in FIG. 2, the right side and the lower side of a triangle are referred to as end sides, and a side shared between adjacent triangles can be protected against double painting by not painting the end side. However, in the present embodiment, the sides of a triangle are defined as illustrated in FIG. 13. In FIG. 13, the side at the upper portion of the triangle and parallel to the scanning line in figure drawing is called an upper side. Similarly, the side at the lower portion of the triangle and parallel to the scanning line is called a lower side. As for other sides when a figure is scanned from the leftmost, a side first reaching the triangle is called a left side, and the side from which the scanning line exits the triangle is called a right side.

Figure 3:
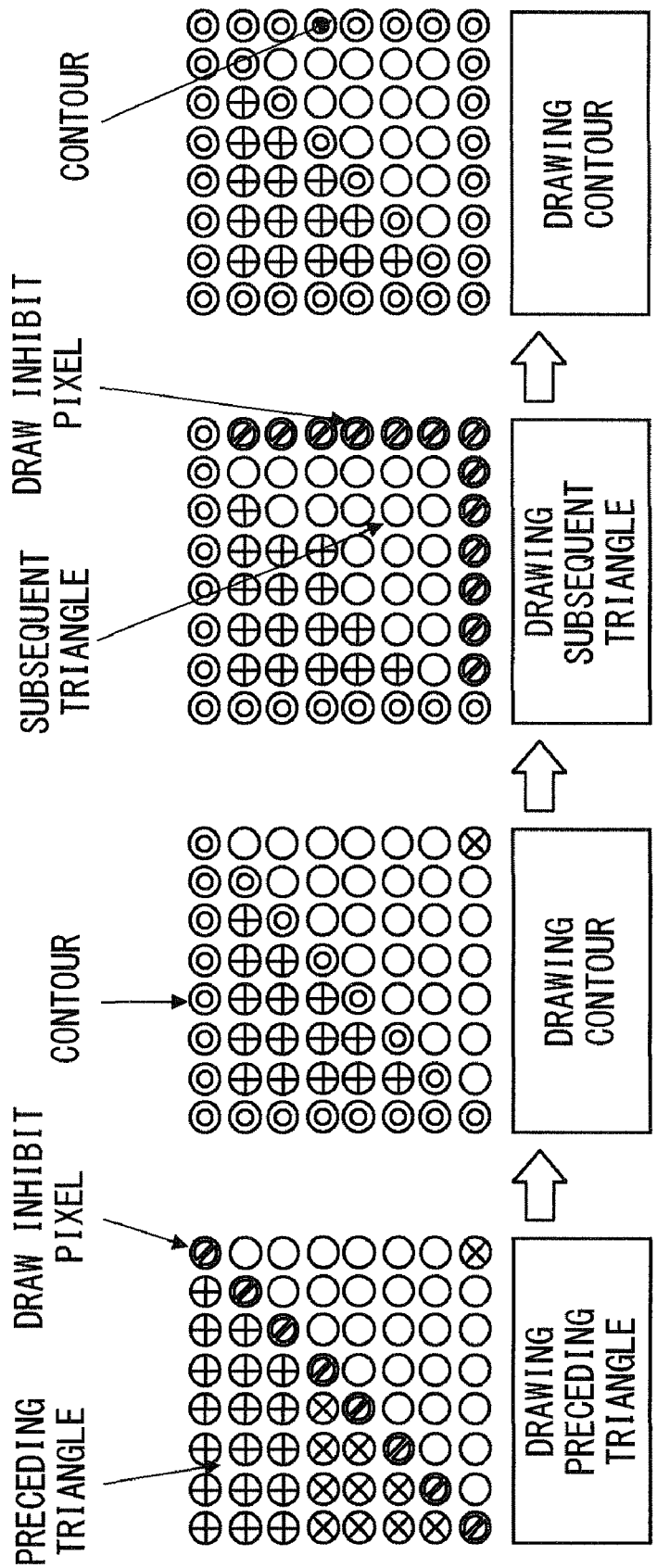
FIG. 3 is an explanatory view of the problem in the prior art illustrated in FIG. 2.
Figure 6:
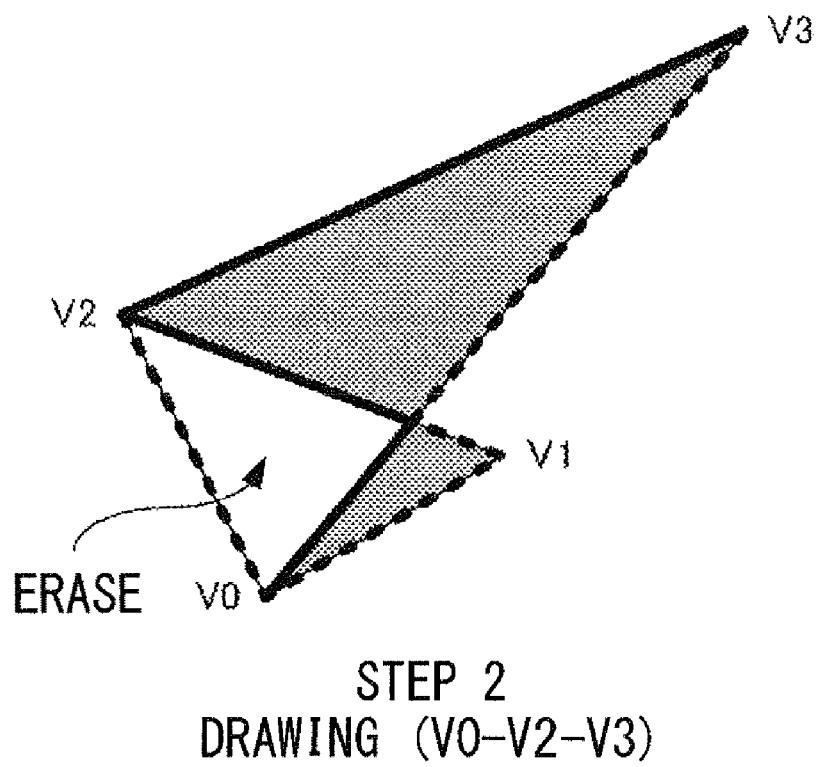
FIG. 6 is an explanatory view of a drawing step 2.
Figure 7:
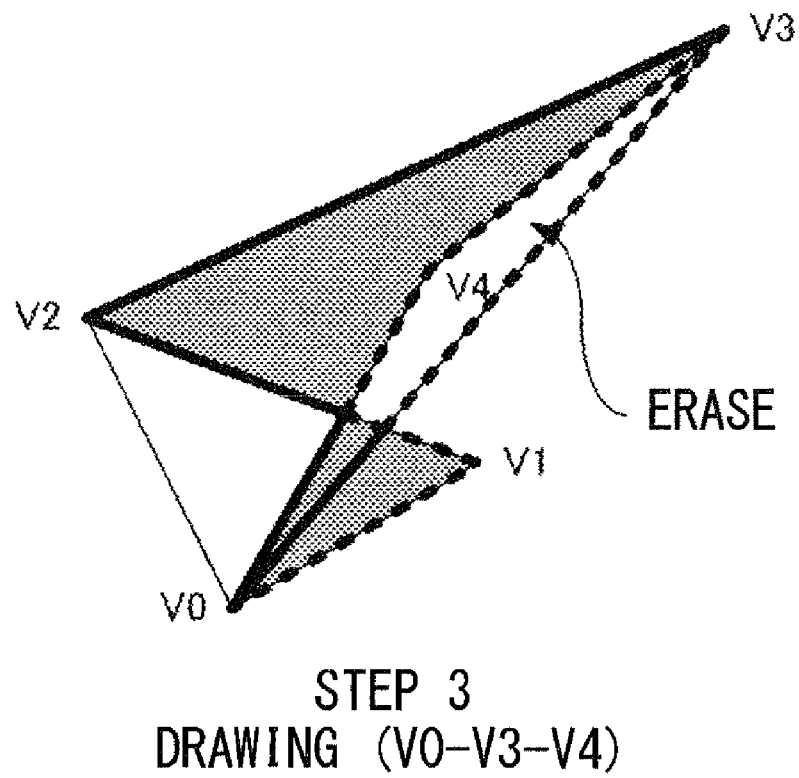
FIG. 7 is an explanatory view of a drawing step 3.
Figure 8:
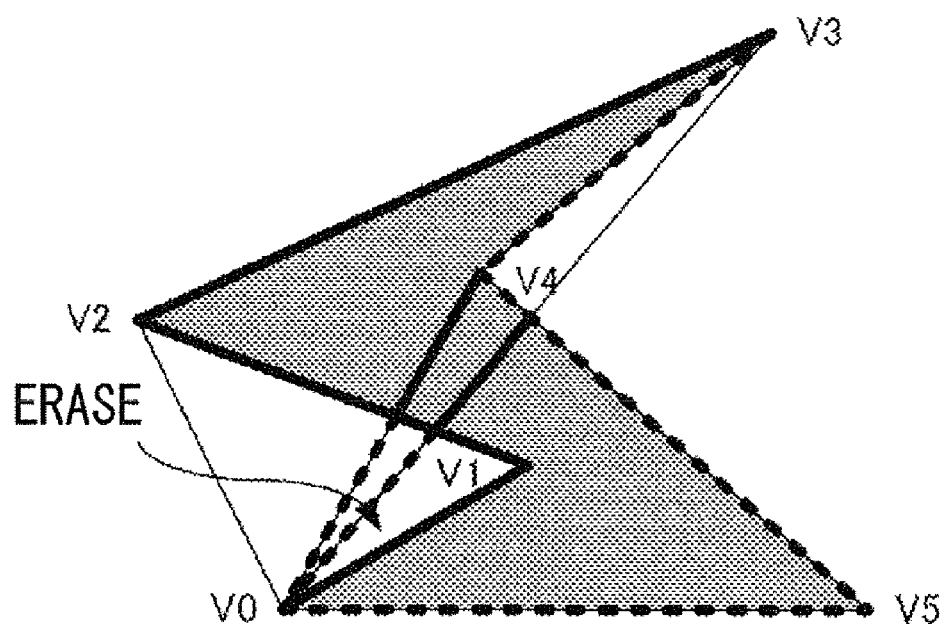
FIG. 8 is an explanatory view of a drawing step 4.
Figure 9:
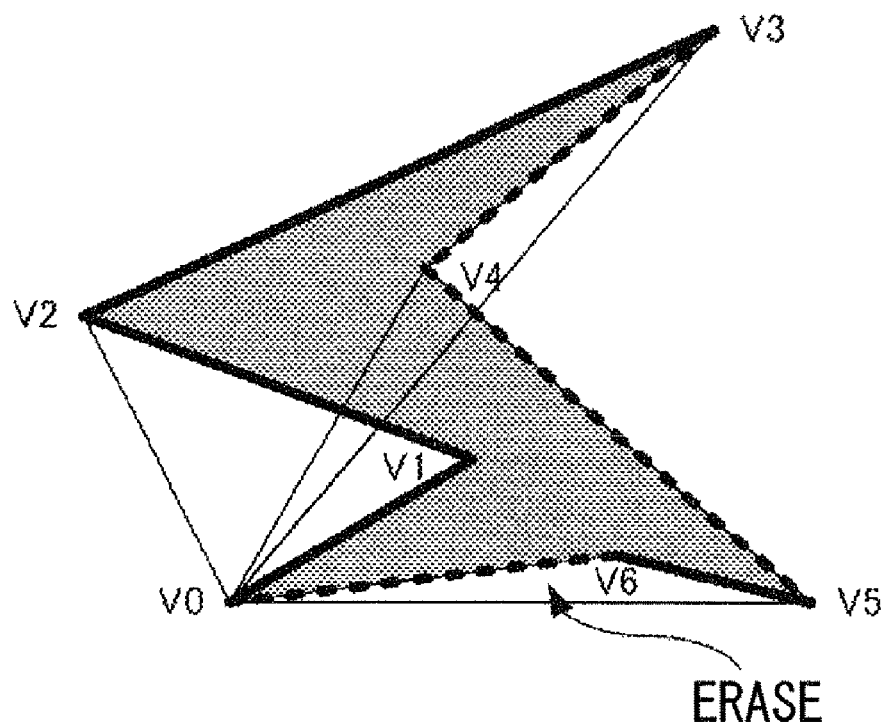
FIG. 9 is an explanatory view of a drawing step 5.
Figure 14:
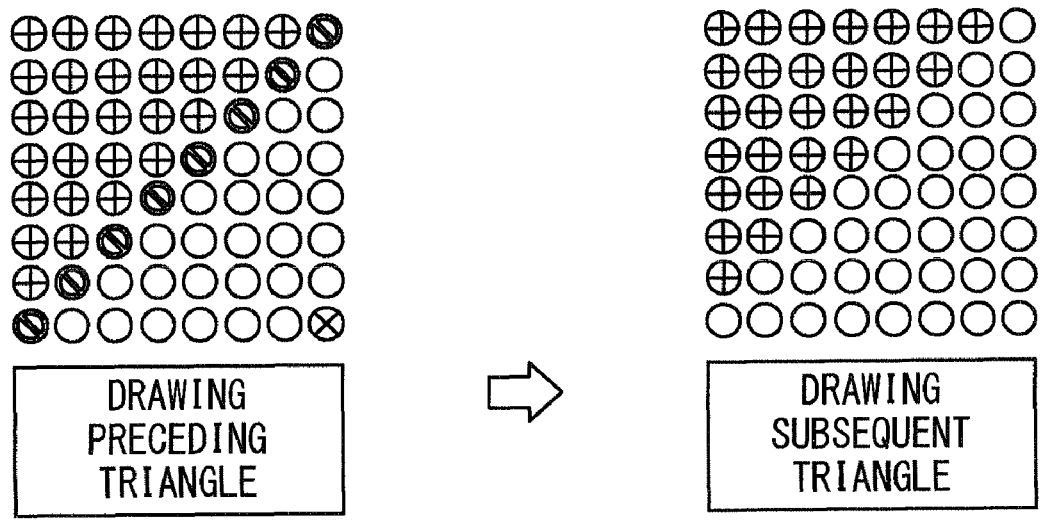
FIG. 14 is an explanatory view of the basic triangle drawing system according to the first embodiment of the present invention.

In the description below, the present invention is roughly divided into two embodiments and described below. The first embodiment is to prevent double painting of the sides of the triangles illustrated in FIGS. 2 and 3. FIG. 14 is an explanatory view of the basic concept of the first embodiment. In the first embodiment, each divisional triangle can be arbitrarily painted for its right side or left side, thereby preventing the double painting of a side shared by adjacent triangles or the failure to paint an end side of a triangle.

In FIG. 14, when a preceding triangle is drawn, the drawing of the right side of the triangle is inhibited as in FIG. 2. When the subsequent triangle is drawn, the drawing of its right and lower sides is not inhibited, but the pixel configuring its right and lower sides are painted, thereby preventing the double painting in drawing the preceding and subsequent triangles and also preventing the occurrence of an unpainted pixel that is to be painted. To realize this system, in the first embodiment, the final painting pixel on the scanning line is increased/decreased by one pixel, and the scanning line for drawing a figure by one line, thereby avoiding the double painting of a side shared by adjacent triangles and the occurrence of an unpainted end side.

Before generally describing the configuration of the figure drawing device according to the first embodiment, a practical example of a figure to be finally drawn by drawing each of a number of triangles obtained by dividing the figure to be drawn is described below using a triangle strip and a triangle fan.

Figure 15:
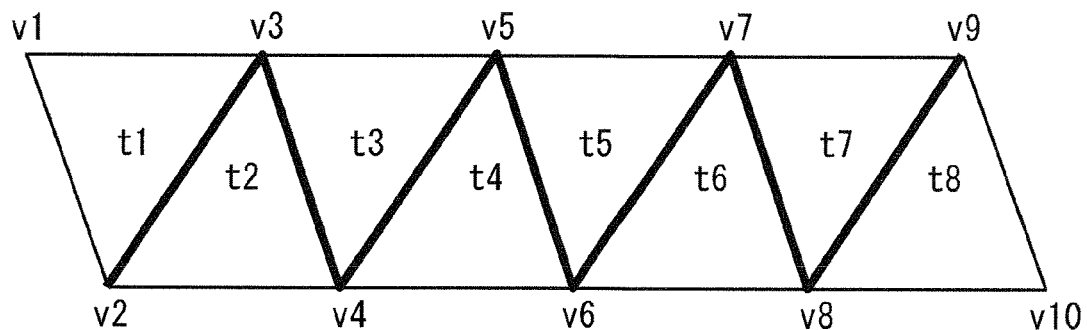
FIG. 15 is an explanatory view of a triangle strip as an example of a drawing target in the first embodiment of the present invention.

FIG. 15 is an example of a triangle strip. It is roughly a parallelogram, but as in the process of drawing a closed polygon described with reference to FIGS. 4 through 9, the vertex coordinates of each of the divisional triangle obtained from the parallelogram are provided as a stream, the divisional triangles are sequentially drawn in the vertex input sequence, and the final and entire triangle strip is drawn.

In FIG. 15, the triangle strip is divided into eight triangles t1 through t8, and the shared sides in the sides of the triangles, that is, all inner sides except the sides as the contour of the parallelogram are sides having a double painting risk. The inner sides and the other contour sides can be separately drawn, thereby avoiding the double painting of the inner sides.

Figure 16:
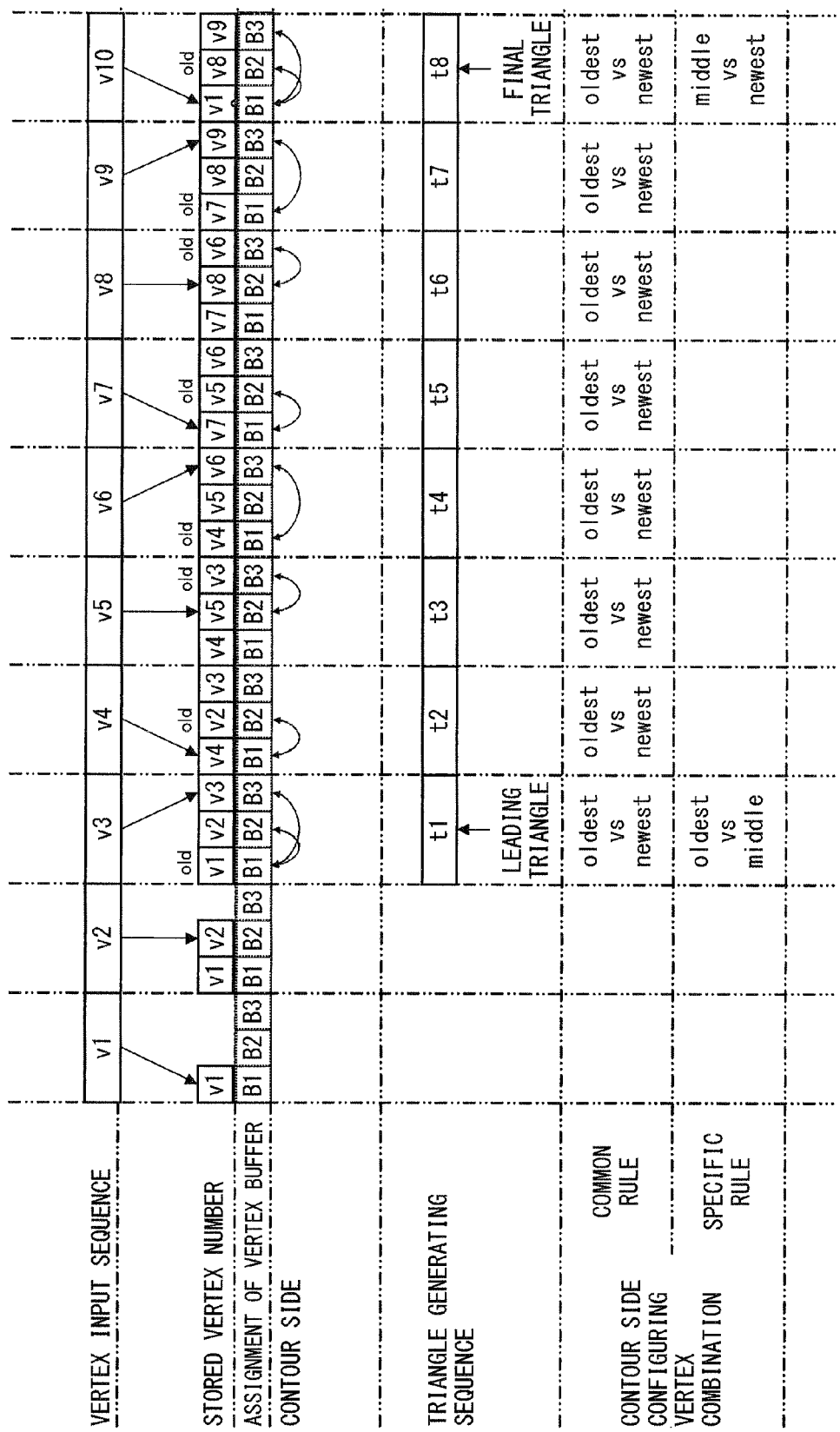
FIG. 16 is an explanatory view of a vertex input sequence to the triangle strip illustrated in FIG. 15 and a contour side configuration vertex combination rule.

FIG. 16 is an explanatory view of a vertex coordinate storage system in a vertex buffer corresponding to each divisional triangle according to a vertex input sequence of providing as a stream the vertex coordinates of a triangle strip as the serial triangle illustrated in FIG. 15 and a rule for determining the combination of vertexes configuring the contour sides of the divisional triangles.

In FIG. 16, the coordinates of the vertex v1 are provided in the first cycle, the coordinates are stored in one of the vertex buffers, that is, a vertex buffer B1 corresponding to the three vertexes of the triangle. In the next cycle, the coordinates of the vertex v2 are provided. and are stored in the vertex buffer B2 in the three vertex buffers.

When the coordinates of the vertex v3 are stored in the vertex buffer B3 in the next third cycle, three vertexes of the leading triangle t1 illustrated in FIG. 15 are provided. Described below is the rule of the combination of the vertexes configuring contour sides. In the three sides of the leading triangle t1, the side connecting the vertex v1 to the vertex v2 and the side connecting the vertex v1 to the vertex v3 are the contour sides. The coordinates of the vertex v1 refer to the oldest vertex in the three vertexes stored from the vertex buffer B1 to the vertex buffer B3, the coordinates of the vertex v3 are the latest stored vertex coordinates, and the coordinates of the vertex v2 are stored in the intermediate point between them. Therefore, the contour side connecting the vertex v1 to the vertex v3 refers to the combination of the oldest and newest vertexes in time among the three vertexes. The combination is used as the common rule for the leading triangle t1 through the final triangle t8.

The leading triangle t1 has another contour side connecting the vertex v1 to the vertex v2. The side refers to a specific rule of a contour side configuring vertex combination for the leading triangle, and indicates the combination of the oldest vertex stored in the vertex buffer B1 and the middle vertex stored in the vertex buffer B2.

In the fourth cycle, the coordinates of the vertex v4 is overwritten in the vertex buffer B1. Thus, the three vertexes are provided for the triangle t2. The contour side of the triangle is a side connecting the vertex v2 and the vertex v4, and the side refers to the oldest vertex coordinates stored in the vertex buffer B2 and the newest vertex coordinates stored in the vertex buffer B1.

In each of the fifth cycle through the ninth cycle, one vertex is provided. For example, in the fifth cycle, the three vertexes of the divisional triangles t3 through t7 are stored in the vertex buffer B1 through the vertex buffer B3, and the contour sides of the triangles are detected by the common rule of the oldest and the newest.

In the final tenth cycle, the three vertex coordinates of the final triangle t8 are provided by storing the coordinates of the final vertex v10 in the vertex buffer B1, and in addition to the contour side by the combination of the vertexes v8 and V10 by the common rule, the contour side connecting the vertex v9 stored in the vertex buffer B3 to the vertex v10 stored in the vertex buffer B1 is detected by the specific rule for the final triangle, that is, the rule of the middle and the newest.

FIG. 17 is an explanatory view of a triangle fan as another example of serial triangles. In the triangle fan, basically in the vertexes of a polygon, that is, a octagon illustrated in FIG. 17, the polygon is divided into serial triangles by sequentially connecting one vertex v1 to another vertex. As with the triangle strip illustrated in FIG. 15, the contour sides of the entire polygon are free of the double painting risk, and the inner sides are subject to the double painting risk.

Figure 18:
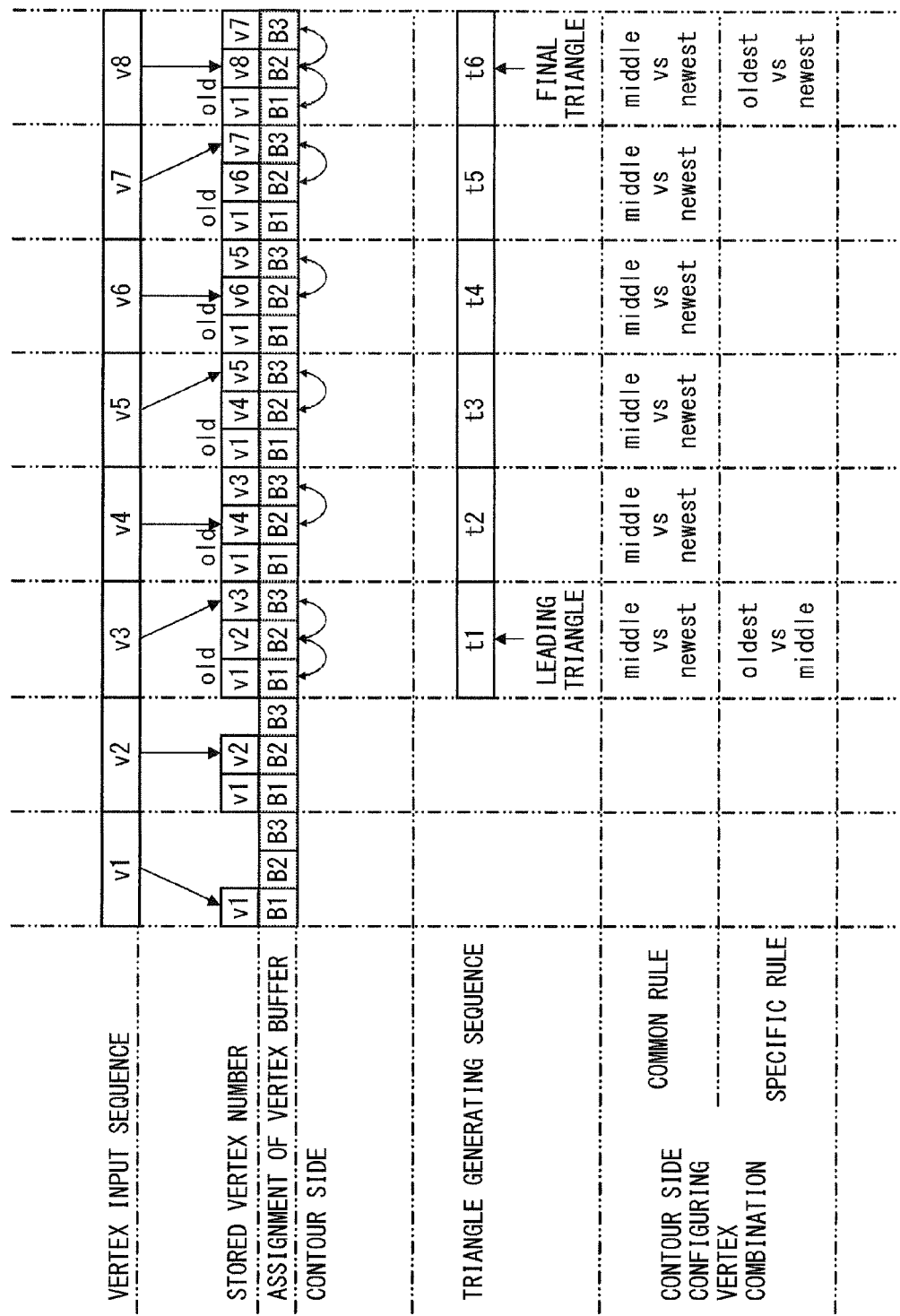
FIG. 18 is an explanatory view of a vertex input sequence to the triangle fan illustrated in FIG. 17 and a contour side configuration vertex combination rule.

FIG. 18 is an explanatory view of a vertex input sequence to the triangle fan and a common rule and a specific rule of a contour side configuration vertex combination. In FIG. 18, the assignment of a vertex buffer up to the third cycle is similar to that in FIG. 16. As a common rule of the contour side configuring vertex combination for a triangle fan is the middle and the newest, and the vertexes v2 and v3 in the sides of the leading triangle t1 are detected as a combination configuring a contour side. For the leading triangle the oldest and the middle are used as a specific rule, and the side connecting the vertex v1 to the vertex v2 is also detected as a contour side.

In the fourth cycle, the coordinates of the vertex v4 are provided. However, unlike the triangle strip illustrated in FIG. 16, the coordinates of the vertex v4 are stored in the vertex buffer B2, and the coordinates of the vertex v1 stored in the vertex buffer B1 are kept as is because the vertex v1 is constantly used as the vertex of each of the six divisional triangles in FIG. 17. Then, as the common rule, the side connecting the vertexes v3 and v4 is detected as a contour side.

Similar operations are performed up to the seventh cycle to assign the vertex buffer to the vertexes of the three triangles t3 through t5, and detect the contour side configuring vertex combination on the basis of the common rule.

In the final eighth cycle, the coordinates of the vertex v8 are provided, and the three vertexes of the final triangle t6 are provided, but the side connecting the vertexes v7 and v8 is detected as a contour side by the common rule of the contour side configuring vertex combination for the final triangle, and the side connecting the vertexes v1 and v8 is detected as a contour side by the specific rule for the final triangle, that is, the oldest and the newest.

Figure 19A:
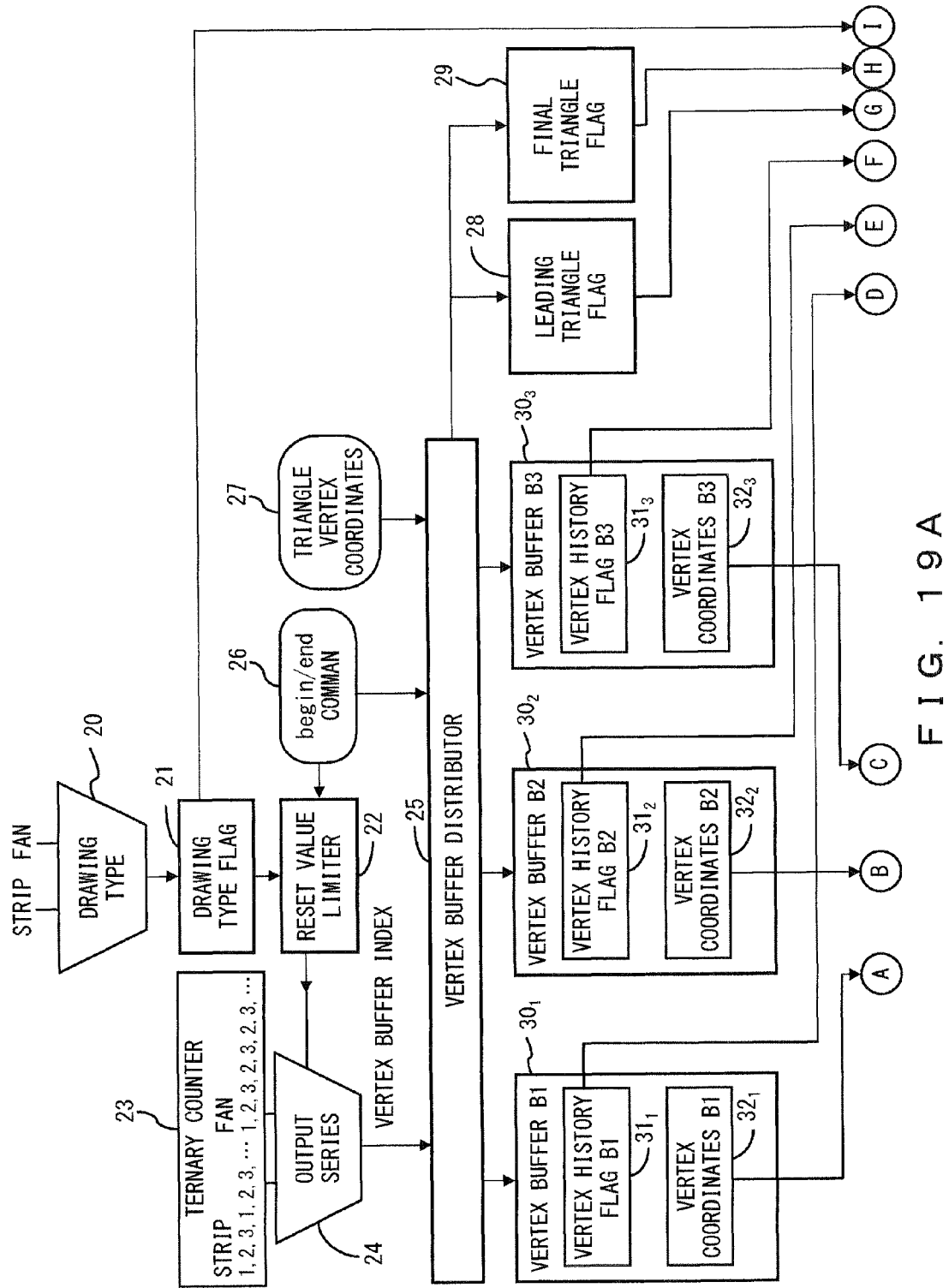
FIGS. 19A and 19B are block diagrams of the detailed configuration of the graphics LSI according to the first embodiment of the present invention.
Figure 19B:
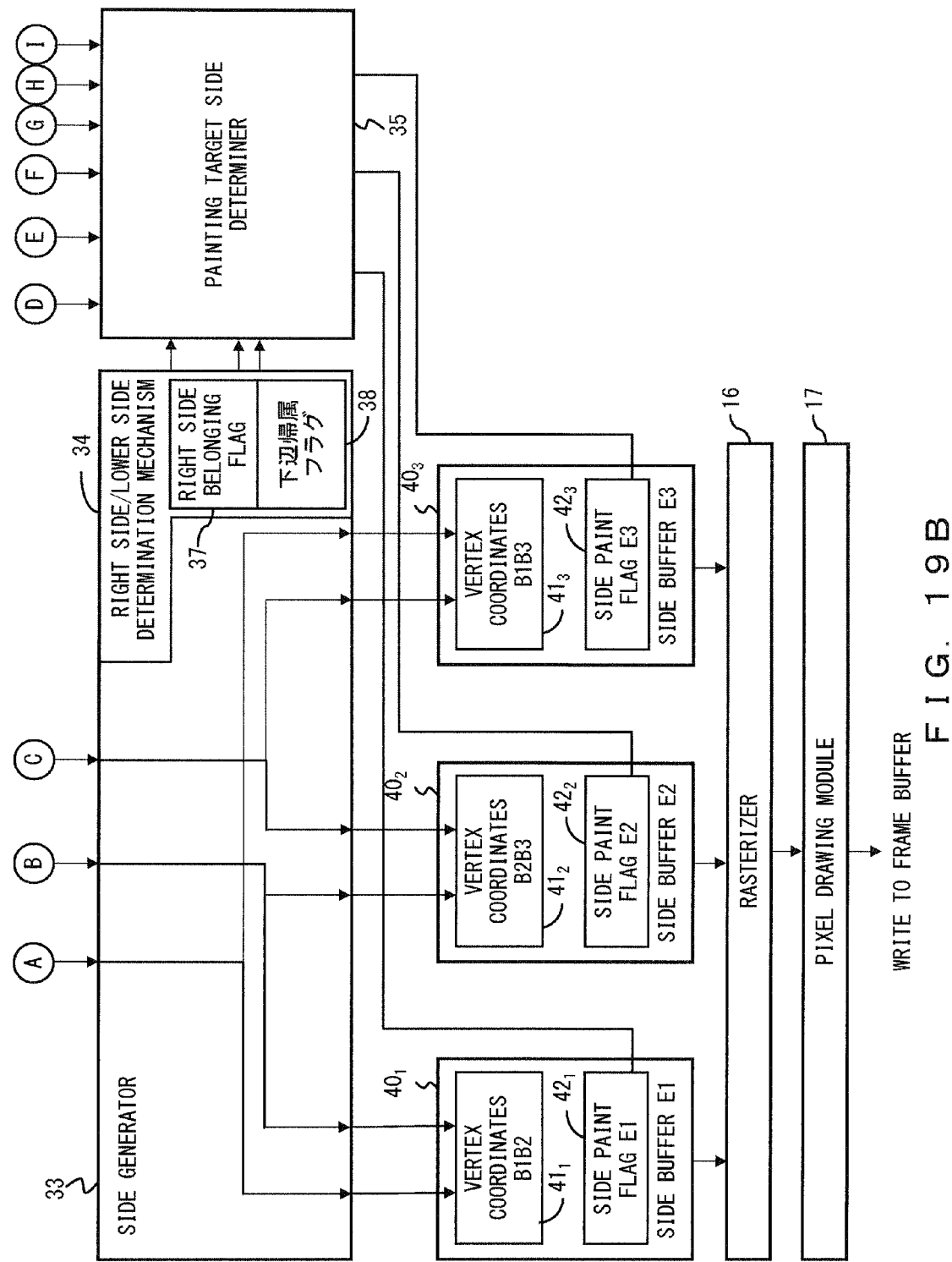

FIGS. 19A and 19B are block diagrams of the detailed configuration of the inside of the graphics LSI 10, except the display controller 18, as an important part of the figure drawing device according to the first embodiment, and are especially block diagrams of the detailed configuration of the vertex processing (figure processing) module 15. In FIGS. 19A and 19B, a drawing type selector 20 first outputs a drawing type flag 21 indicating whether serial triangles to be drawn are a triangle strip or a triangle fan, and the drawing type flag 21 is provided for a reset value limiter 22 and a painting target side determiner 35 described later.

The reset value limiter 22 impose a limitation on a counter value output by a ternary counter 23. No limitation is imposed on the output of the ternary counter with respect to the triangle strip, and the ternary counter 23 repeats counting 1 through 3 as counter values while counting 1 through 3 first for the triangle fan, then not outputting "1" as a counter value but repeating outputting "2 and 3" as described with reference to FIG. 18 in which after storing vertex data first in the three vertex buffers B1 through B3, the stored data in the vertex buffer B1 is not updated, but the stored data in the vertex buffers B2 and B3 is updated. Then, the counter value output by the ternary counter 23 is provided for a vertex buffer distributor 25 by an output series selector 24 as series, that is, a vertex buffer index as streaming data.

For the reset value limiter 22 and the vertex buffer distributor 25, a begin/end command 26 indicating the start and the end of the vertex input sequence described with reference to FIG. 16 is provided, and a reset value limiting operation and a distribution of vertex data to a vertex buffer are performed. Triangle vertex coordinates 27 are provided for the vertex buffer distributor 25.

The vertex buffer distributor 25 provides three vertex buffers $30_1$, $30_2$ and $30_3$ with three vertex coordinates $32_1$ through $32_3$ configuring serial triangles, and stores vertex history flags $31_1$ through $31_3$. A vertex history flag indicates whose vertex coordinates, the oldest, the middle, or the newest are stored in the three vertex buffers B1 through B3 in FIG. 16.

The coordinates of the three vertexes stored in the three vertex buffers are provided for a side generator 33 and a right side/lower side determination mechanism 34. The side generator 33 outputs two vertex coordinates $41_1$ through $41_3$ configuring three sides E1 through E3 to three side buffers $40_1$ through $40_3$ corresponding to the three vertex coordinates stored in the three vertex buffers $30_1$ through $30_3$.

The three vertex history flags $31_1$ through $31_3$ are also provided for a painting target side determiner 35. The painting target side determiner 35 is the most important element in the first embodiment, and the drawing type flag 21 is further provided for the painting target side determiner 35 in addition to a leading triangle flag 28 and a final triangle flag 29 output from the vertex buffer distributor 25, and a right side belonging flag 37 and a lower side belonging flag 38 are also provided from the painting target side determiner 35. The right side belonging flag 37 and the lower side belonging flag 38 indicate whether or not each vertex belongs to a right side or a lower side for the coordinates of the three vertexes stored in the three vertex buffers $30_1$ through $30_3$, and are provided for the painting target side determiner 35 corresponding to the three vertexes.

The detailed configuration and the operation of the are described later, but side painting flags $42_1$ through $42_3$ indicating whether or not each of the sides E1 through E3 is to be painted with respect to the painting target side determiner 35 are output from the painting target side determiner 35 to the three side buffers $40_1$ through $40_3$.

Then, when the two vertex coordinates $41_1$ through $41_3$ configuring the three sides stored in the side buffers $40_1$ through $40_3$, and the side painting flags $42_1$ through $42_3$ for the respective sides are provided for the rasterizer 16, and each of the serial triangles is drawn, it is determined whether or not each pixel is to be painted, the determination result is provided for the pixel drawing module 17, and the data for drawing a figure, that is, drawing data, is stored in a frame buffer.

Figure 20:
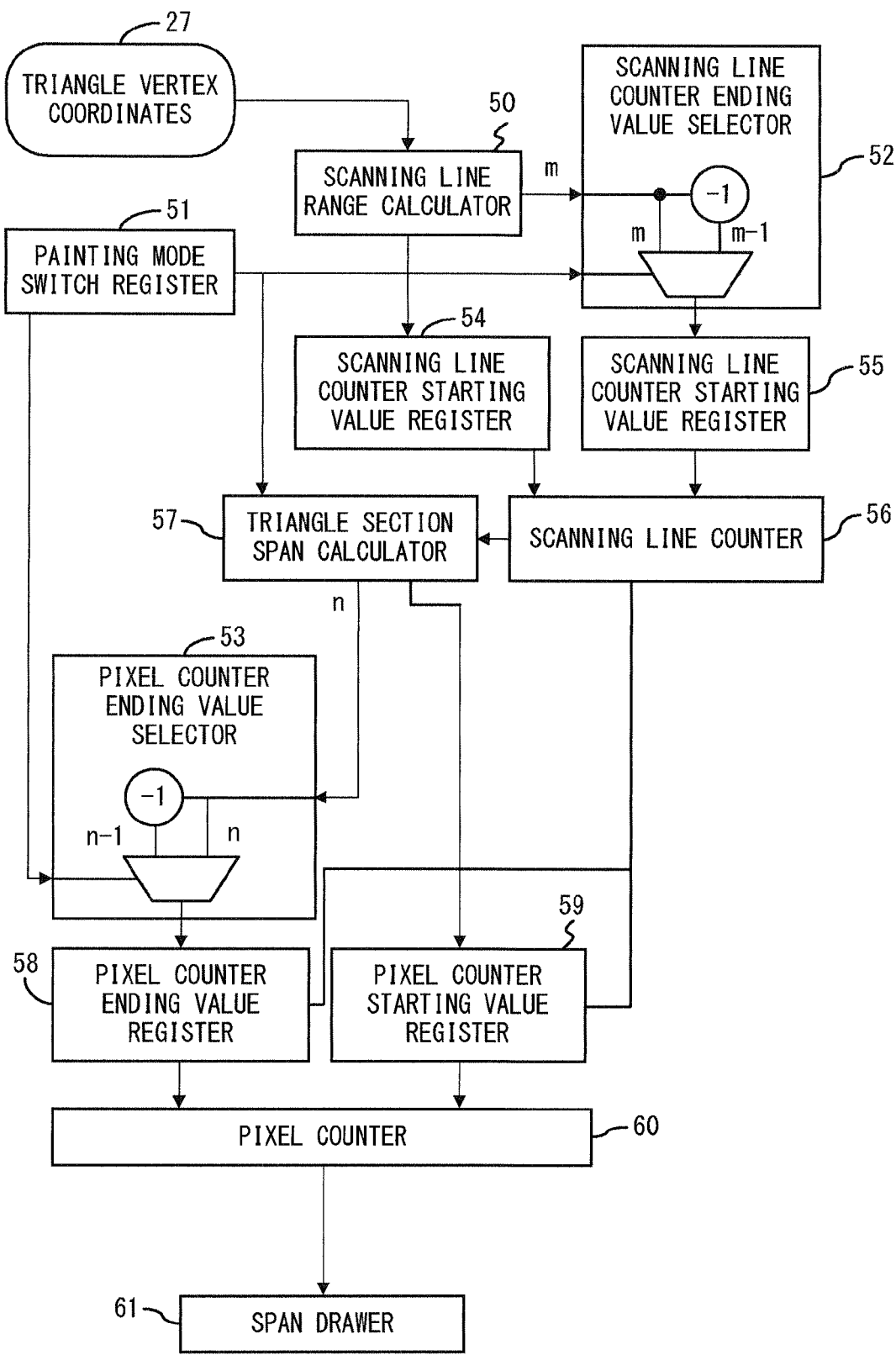
FIG. 20 is a block diagram of the detailed configuration of the rasterizer and the pixel drawing module illustrated in FIG. 19.

FIG. 20 is a block diagram of the detailed configuration of the rasterizer 16 and the pixel drawing module 17 illustrated in FIGS. 19A and 19B. In FIG. 20, the pixel drawing module 17 illustrated in FIGS. 19 A and 19B basically corresponds only to a span drawer 61, and other components correspond to the elements configuring the rasterizer 16.

In FIG. 20, the triangle vertex coordinates 27 are provided for a scanning line range calculator 50. The data of side painting flags $42_1$ through $42_3$ stored in the side buffers $40_1$ through $40_3$ illustrated in FIGS. 19A and 19B is provided for a painting mode switch register 51, and the painting mode is switched depending on the data.

The output of the painting mode switch register 51 is used for switching control of a scanning line counter ending value selector 52 and a pixel counter ending value selector 53 in the present embodiment. The scanning line range calculator 50 outputs the number m of the scanning lines from the highest to the lowest scanning line required to draw a triangle. The ending value m is output to a scanning line counter ending value register 55 when the lowermost scanning line does not match the lower side of the triangle or is to be painted although it matches the lowermost scanning line, and the ending value m−1 is output to the scanning line counter ending value register 55 when the lowermost scanning line matches the lower side of the triangle and is not to be painted.

On the other hand, a scanning line counter starting value register 54 stores the starting value indicating the uppermost scanning line in the scanning line range output by the scanning line range calculator 50, and the starting value and the ending value stored in the two registers 54 and 55 are provided for a scanning line counter 56. The counter value of the scanning line output by the scanning line counter 56 is provided for a triangle section span calculator 57 with the triangle vertex coordinates 27. The span when the scanning line crosses the triangle, that is, the number n of pixels, is calculated, and the value is provided for the pixel counter ending value selector 53.

The pixel counter ending value selector 53 outputs n to a pixel counter ending value register 58 as a pixel counter ending value when the pixels configuring the right side of the triangle are to be painted in the pixels on the scanning line, and outputs n−1 to the pixel counter ending value register 58 when the pixels are not to be painted. Then, the ending value is provided from the triangle section span calculator 57, and provided for a pixel counter 60 together with the starting value stored in a pixel counter starting value register 59, and a span drawer 61 generates pixel data for the pixels to be painted on each scanning line according to the counter value output by the pixel counter 60, and the generated data is stored in a frame buffer.

FIG. 21 is a block diagram of the basic configuration of the painting target side determiner 35 illustrated in FIGS. 19A and 19B. In FIG. 21, the painting target side determiner 35 is basically configured by a contour side belonging flag generation unit 63, a right side or lower side flag generation unit 65, and three AND gates $67_1$ through $67_3$.

The contour side belonging flag generation unit 63 is provided with the three vertex history flags $31_1$ through $31_3$ of the triangle, the leading triangle flag 28, and final triangle flag 29 in the input to the painting target side determiner 35 described with reference to FIGS. 19A and 19B. In response to the input of the flags, the contour side belonging flag generation unit 63 outputs to the three side buffers $40_1$ through $40_3$ illustrated in FIGS. 19A and 19B contour side belonging flags $64_1$ through $64_3$ indicating whether or not the three corresponding sides E1 through E3 are contour sides.

The right side or lower side flag generation unit 65 receives right side belonging flags $37_1$ through $37_3$ and lower side belonging flags $38_1$ through $38_3$ for the three vertexes of the triangle output from the right side/lower side determination mechanism 34 illustrated in FIGS. 19A and 19B, and outputs right side/lower side flags $66_1$ through $66_3$ indicating whether the sides E1 through D3 respectively corresponding to the side buffers $40_1$ through $40_3$ are right sides or lower sides. The flags are provided for the three AND gates $67_1$ through $67_3$ for the respective sides together with contour side belonging flags $64_1$ through $64_3$, and the side painting flags $42_1$ through $42_3$ are output from the AND gates. The contour side belonging flag generation unit 63 and the right side or lower side flag generation unit 65 are described later in detail.

Figure 22:
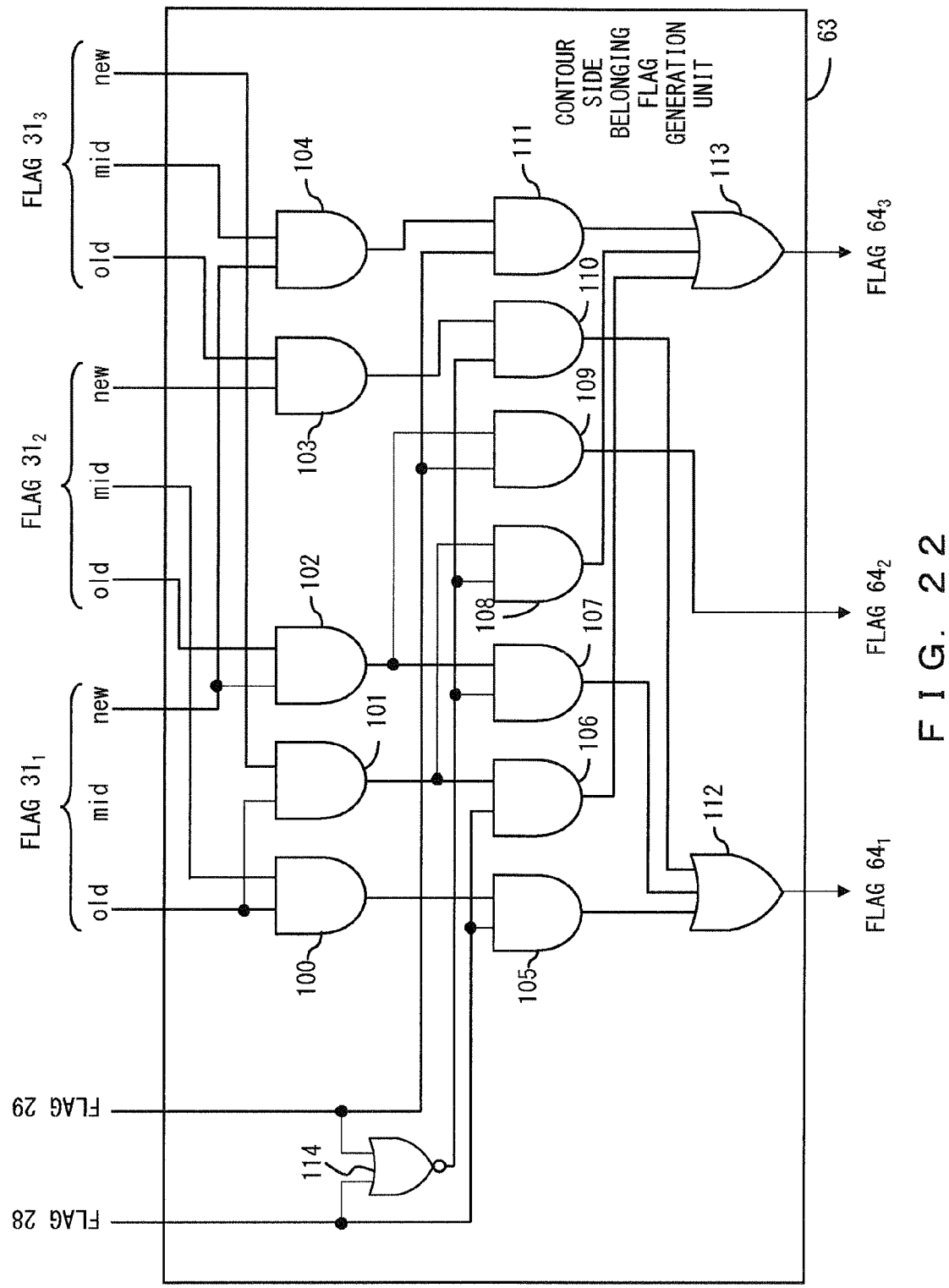
FIG. 22 illustrates the detailed configuration circuit of the output signal belonging flag generation unit (1) illustrated in FIG. 21.
Figure 23:
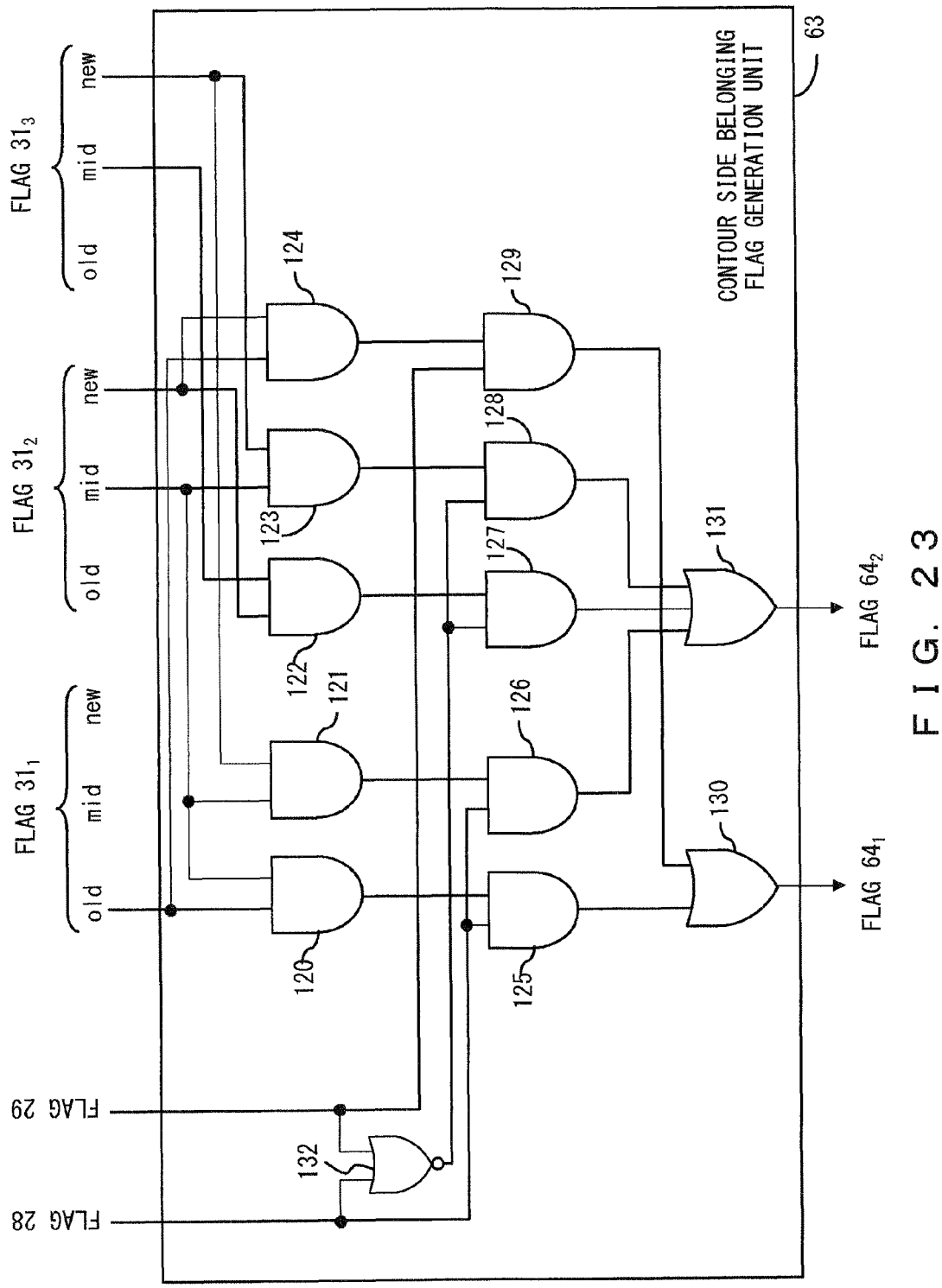
FIG. 23 illustrates the detailed configuration circuit of the output signal belonging flag generation unit (2) illustrated in FIG. 21.

FIGS. 22 and 23 illustrate the circuits of the detailed configuration of the contour side belonging flag generation unit 63 illustrated in FIG. 21. FIG. 22 illustrates the right side or lower side flag generation unit 65 corresponding to the data structure of the triangle strip described with reference to FIG. 15. FIG. 23 illustrates a circuit of the detailed configuration of the right side or lower side flag generation unit 65 corresponding to the data structure of the triangle fan described with reference to FIG. 17.

A part of the operation of the contour side belonging flag generation unit 63 illustrated in FIG. 22 is described below in accordance with the contour side configuring vertex combination rule described with reference to FIG. 16. First, the contour side belonging flags $64_1$ for the side E1 is output through AND gates 100 and 105 and an OR gate 112 on the basis of the specific rule for the leading triangle t1. Also the contour side belonging flags $64_3$ for the side E3 is output through AND gates 101 and 106 and an OR gate 113 on the basis of the common rule for the leading triangle.

For the next triangle t2, the contour side belonging flags $64_1$ for the side E1 is output through AND gates 102 and 107 and an OR gate 112 on the basis of the common rule. The same operations are performed on the subsequent triangles t3 through t8, and the descriptions are omitted here.

In FIG. 23, the contour side belonging flags $64_1$ for the side E1 is output through AND gates 120 and 125 and an OR gate 130 on the basis of the specific rule for the leading triangle illustrated in FIG. 18, and the contour side belonging flags $64_2$ for the side 2 is output through AND gates 121 and 126 and an OR gate 131 on the basis of the common rule. The same operations are performed on the subsequent triangles, and the descriptions are omitted here. The contour side belonging flags $64_3$ for the side E3 is not output to the triangle fan illustrated in FIG. 17.

Figure 24:
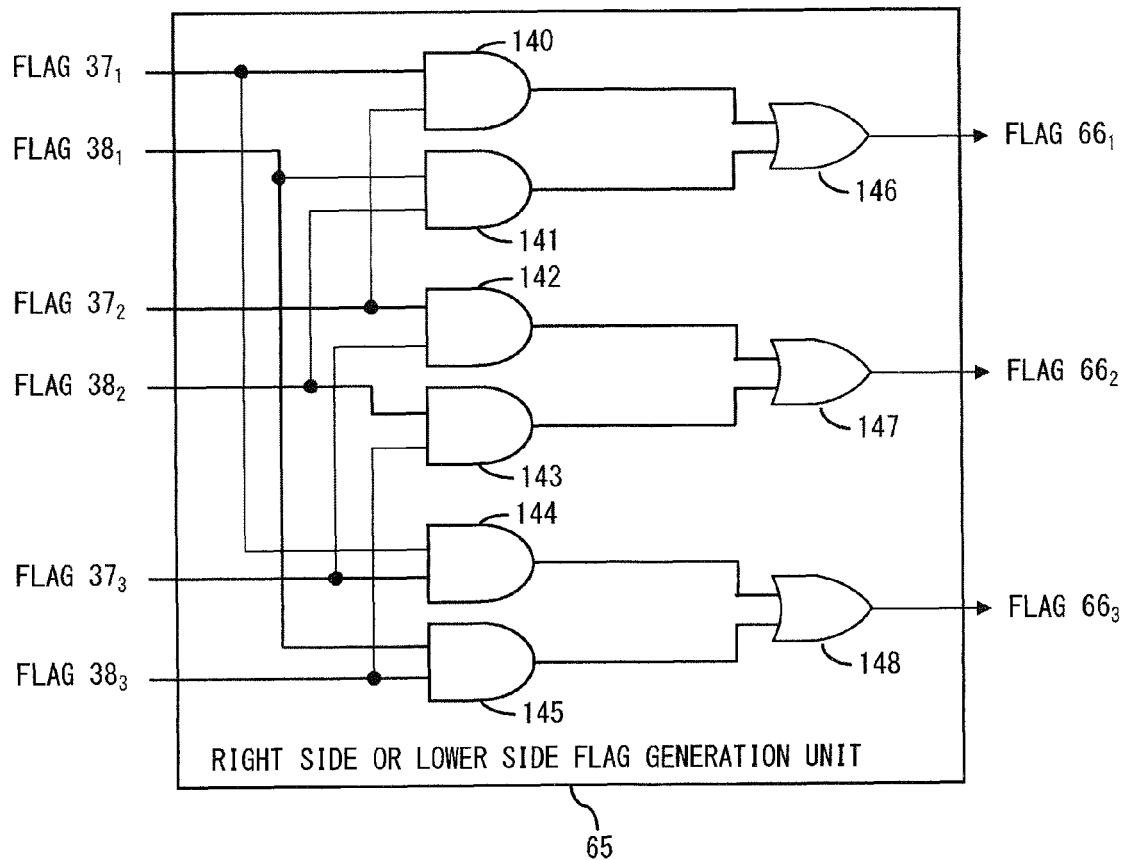
FIG. 24 illustrates the detailed configuration circuit of the right or lower side flag generation unit illustrated in FIG. 21.
Figure 25:
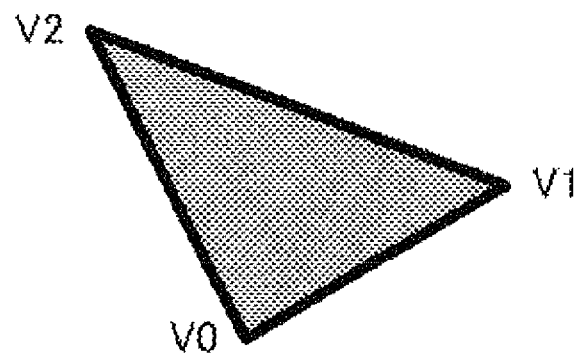
FIG. 25 is an explanatory view of step 1 in drawing a closed polygon when the first embodiment is used.
Figure 26:
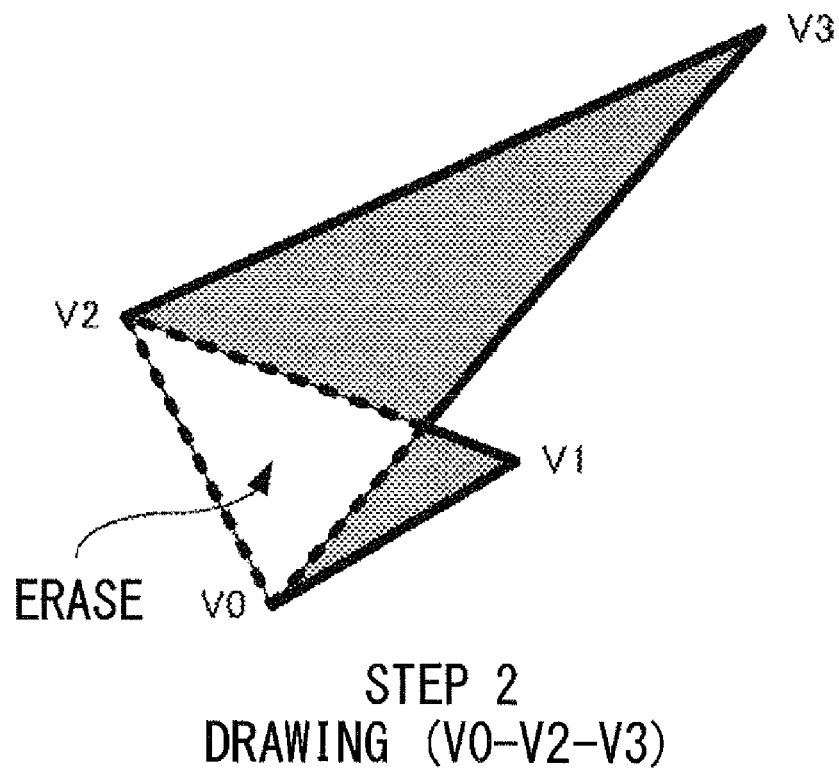
FIG. 26 is an explanatory view of step 2.
Figure 29:
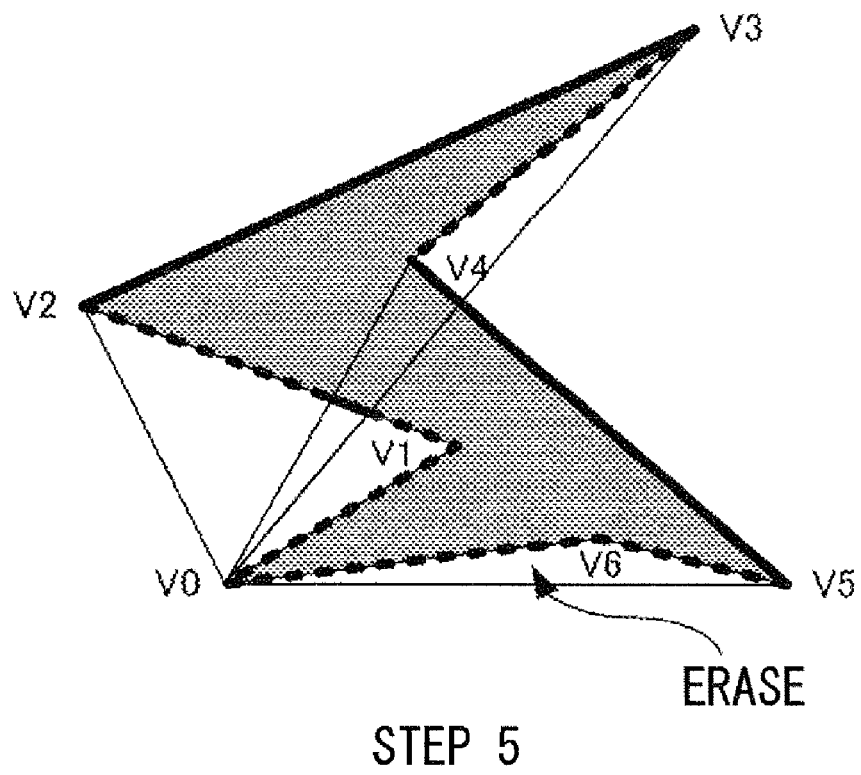
FIG. 29 is an explanatory view of step 5.
Figure 30:
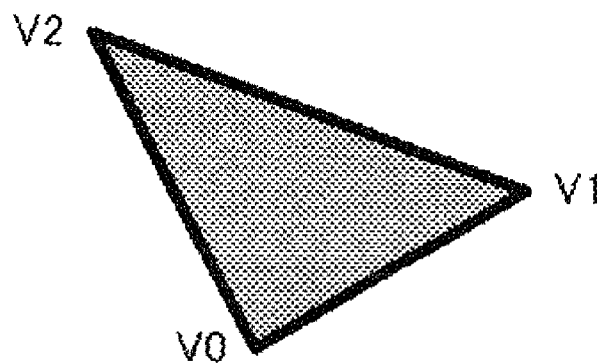
FIG. 30 is an explanatory view of step 1 in drawing a closed polygon in the second embodiment of the present invention.
Figure 31:
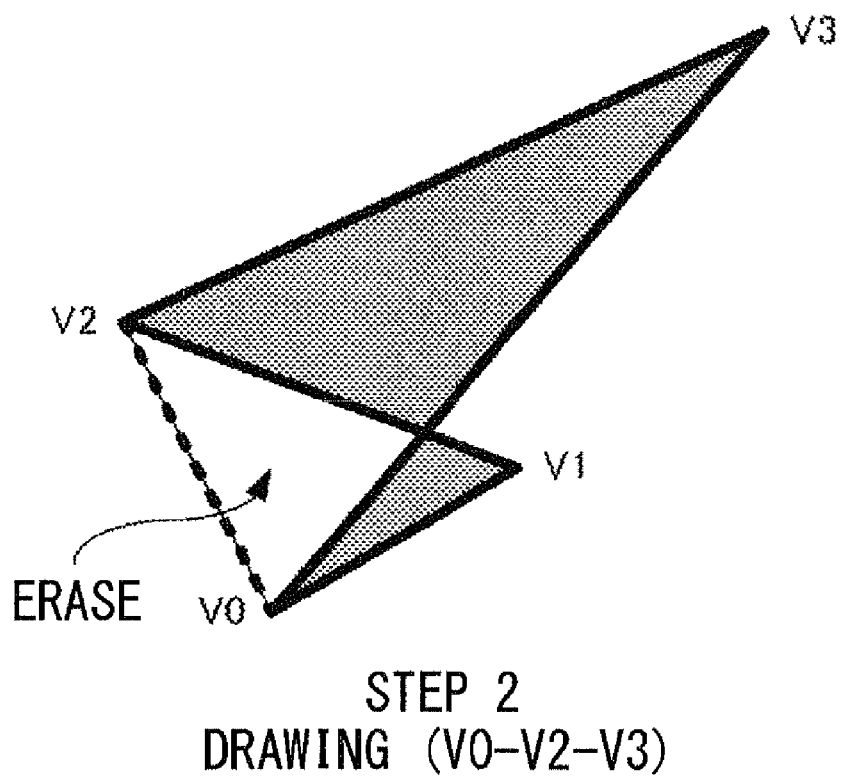
FIG. 31 is an explanatory view of step 2.
Figure 32:
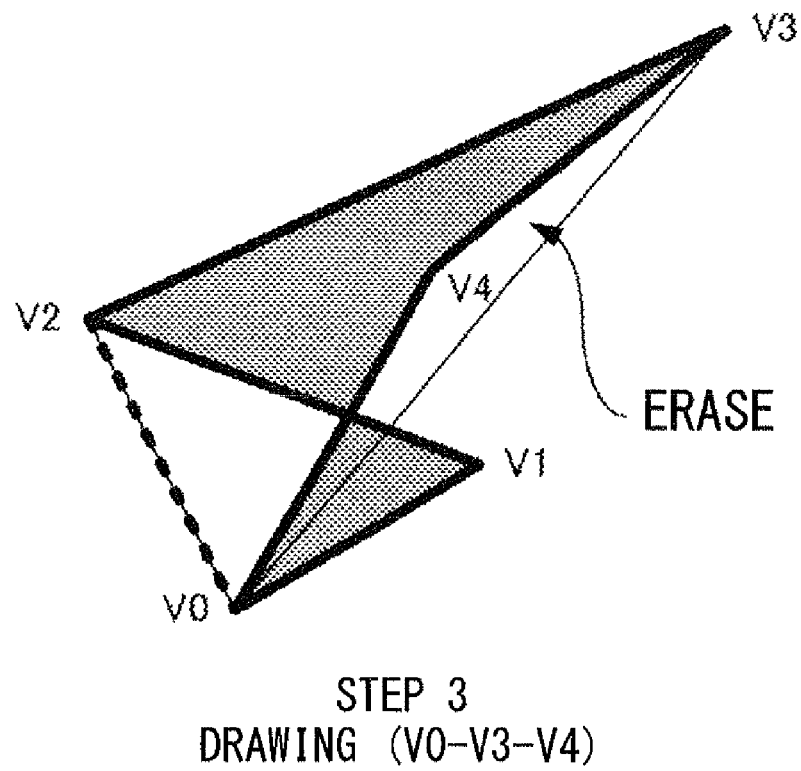
FIG. 32 is an explanatory view of step 3.
Figure 33:
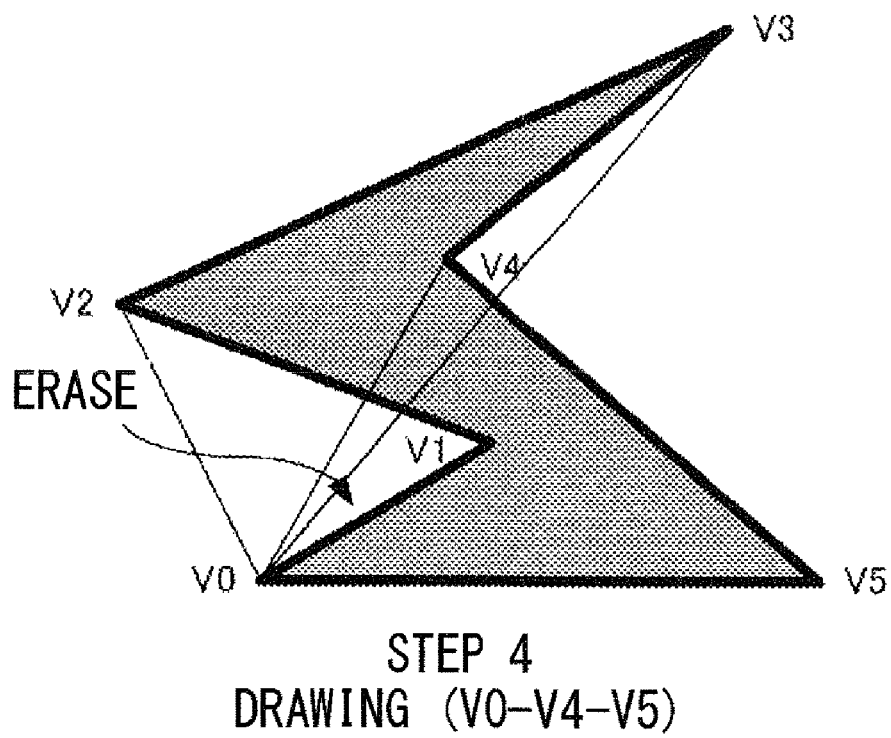
FIG. 33 is an explanatory view of step 4.
Figure 34:
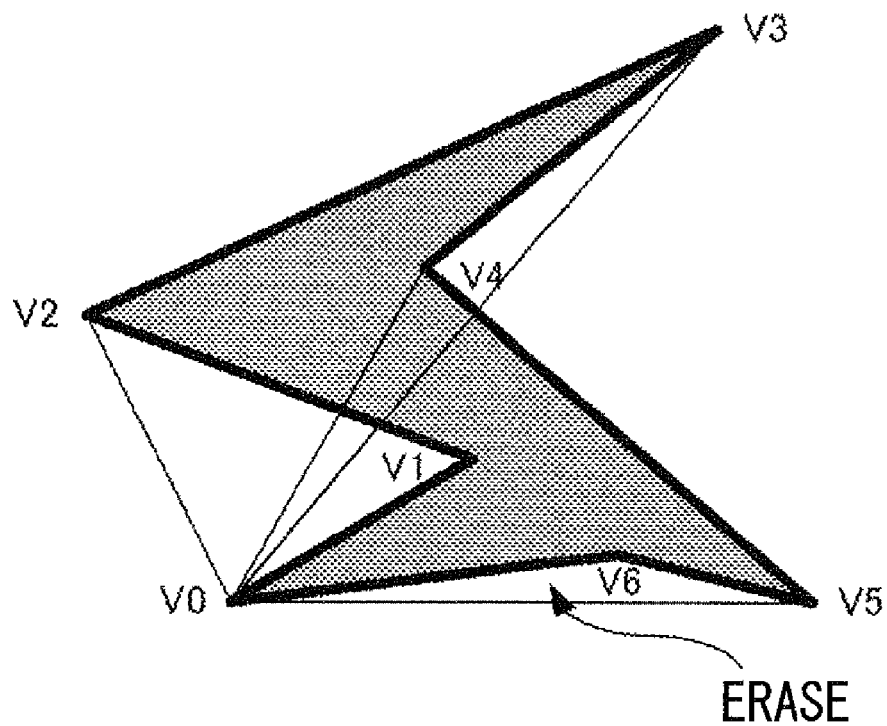
FIG. 34 is an explanatory view of step 5.

FIG. 24 is a block diagram of the detailed configuration of the right side or lower side flag generation unit 65 illustrated in FIG. 21. In FIG. 24, for example, a signal indicating that the side E1 is a right side is output from an AND gate 140, and a signal indicating that the side E1 is a lower side is output from an AND gate 141. As a result, a right side/lower side flags $66_1$ indicating that the side E1 is a right side or a lower side is output from an OR gate 146. Similar outputting operations of other flags $66_2$ and $66_3$ are performed, and the descriptions are omitted here.

The first embodiment is described above, and the second embodiment is described next below. The second embodiment is to solve the problem with the prior art described with reference to FIGS. 4 through 9, that is, the problem that occurs when arbitrary closed polygon including a concave portion is drawn.

In the second embodiment, the drawing system according to the first embodiment is basically applied. Although the contour of a triangle can be correctly painted at a stage of painting each triangle in each step during drawing a final figure, there occurs the problem that the contour can be over-erased in the process of performing the exclusive logical sum operation on the pixel data stored on the stencil buffer.

FIGS. 25 through 29 are explanatory views of the problem. The final drawn figure is the same as the figure illustrated in FIG. 4. In step 1 in FIG. 25, the contour of the triangle can be correctly painted, but in step 2 in FIG. 26, the contour of the overlapping portion between two triangles is erased.

After the drawing in step 3 in FIG. 27 and step 4 in FIG. 28, the drawing for the final drawn figure is completed. However, as compared with the prior art in FIG. 9, the position of the over-erased side is different, but the problem that a contour side is over-erased cannot be solved.

The second embodiment is to prevent the contour of a triangle from being over-erased by correcting an exclusive logical sum operation result around the contour corresponding to the transit format of the pixel data in the stencil buffer to prevent the over-erasure of the pixel data by the exclusive logical sum operation of the pixel data for correctly pasting a new triangle and the pixel data stored in the stencil buffer.

FIGS. 30 through 34 illustrate the step of drawing a closed polygon in the second embodiment. In step 1 in FIG. 30, the contour of the triangle is correctly painted as in FIG. 25. In step 2 in FIG. 31, an inversion is performed on the exclusive logical sum operation result for the pixels configuring the contour over-erased in FIG. 26. As a result, the contour of the closed polygon can be correctly painted. Similarly, in step 3 in FIG. 32, step 4 in FIG. 33, and step 5 in FIG. 34 (final drawn figure), the pixel value of the pixel on the over-erased contour can be inverted to correctly paint the contour.

Figure 35A:
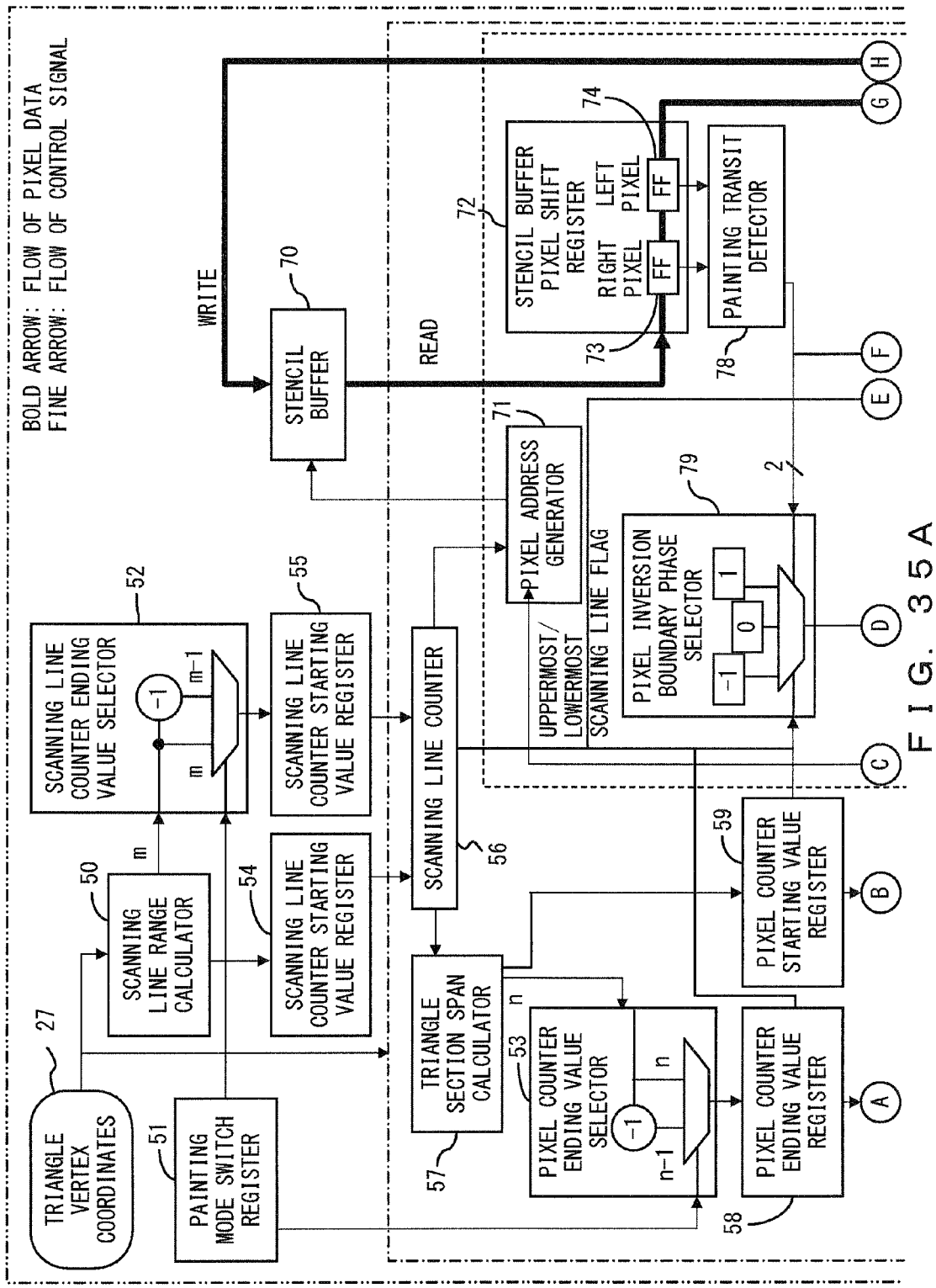
FIGS. 35A and 35B are block diagrams of the detailed configuration of the graphics LSI according to the second embodiment of the present invention.
Figure 35B:
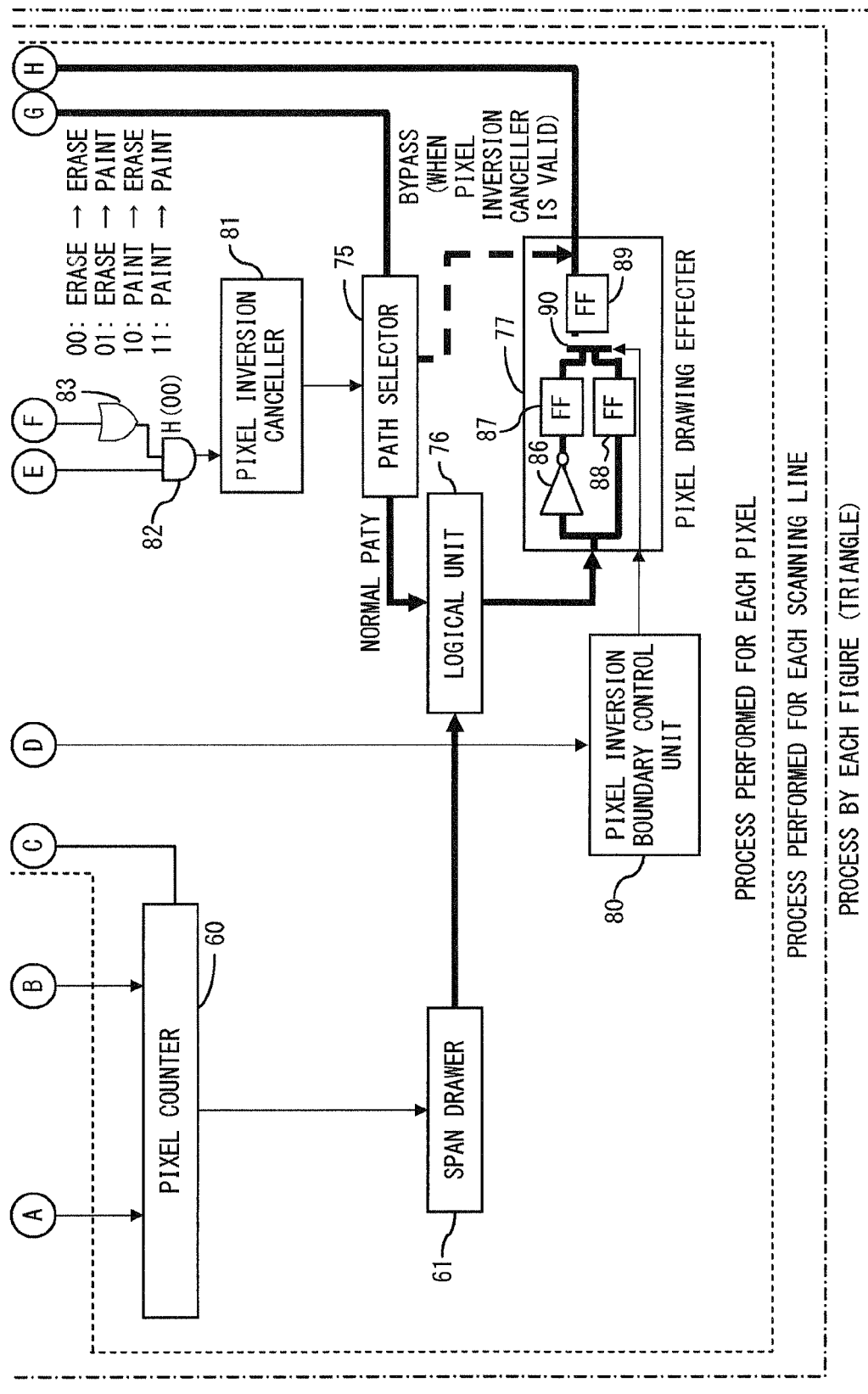

FIGS. 35A and 35B are block diagrams of the detailed configuration of the graphics LSI 10 except the display controller 18 according to the second embodiment of the present invention. When FIGS. 35A and 35B are compared with the block diagram of the configuration in FIG. 20, the component of the right half is added in addition to the component of the left half. With the configuration, FIGS. 35A and 35B substantially illustrate the detailed configuration of the rasterizer 16, but the scanning line range calculator 50 and the painting mode switch register 51 at the upper left in FIG. 35 can be regarded as the elements corresponding to the vertex processing (figure processing) module 15, and the pixel drawing module 17 can be regarded as a module not illustrated in the attached drawings, but for writing data to a stencil buffer 70 from a pixel drawing effecter 77 at the lower right.

In FIGS. 35A and 35B, the configuration up to the 61 on the left is the same as the configuration in FIG. 20. The added portion on the right is drawn before the span drawer 61 is drawing a new triangle as illustrated in FIGS. 31 through 34, a logical unit 76 performs an exclusive logical sum operation of the pixel data corresponding to the pixel to be drawn stored in the stencil buffer 70 and the pixel data to be drawn, that is, "1", basically, and the operation result is written again to the stencil buffer 70. The contour of the triangle illustrated with reference to FIGS. 26 through 29 can be prevented from being over-erased.

Provided on the right in FIGS. 35A and 35B are: a pixel address generator 71 for generating an address of a pixel to be read from the stencil buffer 70; a stencil buffer pixel shift register 72 (configured by two flip-flops 73 and 74) for storing pixel data read in two continuous pixel units from the stencil buffer 70; a path selector 75 for outputting to a normal path of the logical unit 76 the pixel data output from the stencil buffer pixel shift register 72, or bypassing the logical operation by the logical unit 76 on the output data of the span drawer 61 and outputting the result as is to the path for writing the result to the stencil buffer 70 again; a pixel drawing effecter 77 for further inverting a part of the pixel data on the exclusive logical sum operation result by the logical unit 76 so that the contour of the triangle can be prevented from being over-erased; a painting transit detector 78 for detecting the pixel painting transit boundary by the value of the pixel data of the two continuous pixels read from the stencil buffer 70; a pixel inversion boundary phase selector 79 for determining whether or not the pixel inversion boundary (painting transit boundary) is to be moved depending on the output of the painting transit detector 78; a pixel inversion boundary control unit 80 for controlling the inversion of the pixel data on the output of the logical unit 76 by the pixel drawing effecter 77 depending on the output of the pixel inversion boundary phase selector 79; a pixel inversion canceller 81 for bypassing the logical unit 76 from the path selector 75 and controlling a write of the data to the stencil buffer 70 again; a AND gate 82 for allowing the pixel inversion canceller 81 to output an inversion cancel signal; and an OR gate 83 connected to one of the painting transit detector 78 and the AND gate 82.

The pixel drawing effecter 77 includes an inverter 86, three FFs 87 through 89, and a selector 90. By the pixel inversion boundary control unit 80 controlling the switch of the selector 90, the output of one of the FFs 87 and 88 is selected depending on whether or not it is necessary to invert the pixel data output by the logical unit 76, and the operation assigned to the FF 89 at the later stage can be performed.

In FIGS. 35A and 35B, the 2-pixel data is provided for the stencil buffer pixel shift register 72 while the pixels of the 2-pixel data continuous on one scanning line are shifted one by one from the stencil buffer 70. For explanation, for example, if the pixel data is arrangement in the order of "010110 . . . ", "01" is read when the data is first read, then the pixel data is read in the order of "10", "01", "11", "10", . . . , and the rightmost pixel data in the read 2-pixel data is stored in the FF 73, and the leftmost pixel data is stored in the FF 74.

The painting transit detector 78 detects which is the 2-pixel value, "00", "01", "10", or "11". In this example, "01" indicates that the value of the left pixel is "0", and the value of the right pixel is "1".

The pixel inversion boundary phase selector 79 provide the pixel inversion boundary control unit 80 with a signal indicating whether the pixel inversion boundary is to be forwarded or delayed by one pixel, or the output of the logical unit 76 is to be written to the stencil buffer without moving the inversion boundary based on these consecutive 2-pixel pixel data and a flag value indicating a uppermost or lowermost scanning line, which is output by the scanning line counter 56. The pixel inversion boundary is described later in detail.

Only when the 2-pixel data detected by the painting transit detector 78 is not "00", the output of the OR gate 83 is "H". As a result, the output of the AND gate 82 is "H" then the uppermost and lowermost scanning line flags are provided from the scanning line counter 56 to the AND gate 82, and the path selector 75 outputs the pixel data output from the stencil buffer pixel shift register 72 to the bypass path to write the pixel data as is to the stencil buffer 70.

Figure 36B:
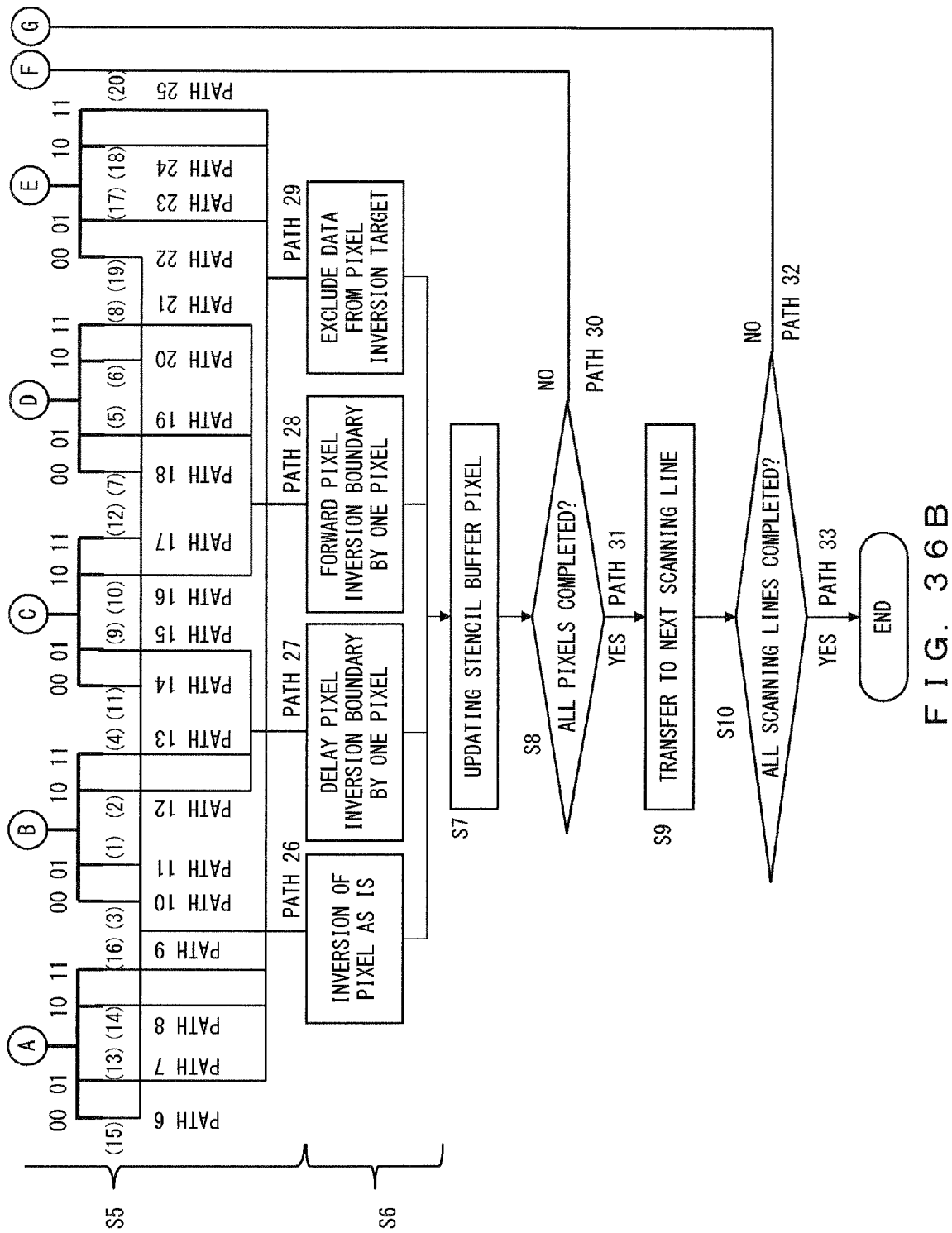

The detailed flowchart of the process performed corresponding to the block diagram of the detailed configuration of the graphics LSI in the figure drawing device according to the second embodiment is described below with reference to FIGS. 36A and 36B. When the process is started as illustrated in FIGS. 36A and 36B, the scanning line range is calculated using the triangle vertex coordinates 27, that is, the stored contents of the vertex buffer first in step S1, the range of the pixels is calculated in step S2, the 2-pixel data is obtained from the stencil buffer 70 in step S3, and the obtained data is stored in the stencil buffer pixel shift register 72. Afterwards, in steps S4 through S6, the process branched depending on the position of the pixel to be drawn by the span drawer 61 is performed. The branch is made depending on whether the pixel to be drawn is on the uppermost scanning line, at the leftmost, inside, or the rightmost of the span calculated by the triangle section span calculator 57, or on the lowermost scanning line.

Furthermore, the process branched by the two consecutive pixels is performed. The two consecutive pixels are stored in the stencil buffer pixel shift register 72, and the transit state of the pixels is detected by the painting transit detector 78. Since these pixels can be considered to be ground pixels for the pixels to be drawn by the span drawer 61, the term "ground pixel" is used here. The branch is made depending on whether the value of the ground pixel is "00", "01", "10", or "11", and the process of inverting the pixel value as is, delaying or forwarding the inversion boundary of the pixel value by one pixel, or excluding the value from the inversion targets is performed.

The value of "1" as the pixel data is naturally provided for the pixel to be drawn by the span drawer 61. If the pixel value of the same pixel stored in the stencil buffer 70 is "0", the result of the exclusive logical sum operation by the logical unit 76 is "1", and if the pixel value stored in the stencil buffer 70 is "1", the result is "0". That is, the stored contents of the stencil buffer 70 for the pixel to be drawn by the span drawer 61 are inverted. In the second embodiment, the process of delaying the boundary of the inversion is to be delayed, forwarded, or not moved is performed by the pixel drawing effecter 77. When the path selector 75 outputs the pixel data of the ground pixel to the bypass path, the data is excluded from the pixel inversion target. The pixel inversion boundary is described later in more detail using a practical example.

In step S7 in FIGS. 36A and 36B, pixel data is written to the stencil buffer 70, that is, the pixel value is updated, it is determined in step S8 whether or not the process on all pixels on one scanning line has been completed. If the process has not been completed, the processes in and after step S3 are repeated. If it is determined that the process on all pixels on the scanning line has been completed, then control is passed to the next scanning line in step S9, and it is determined in step S10 whether or not the process on all scanning lines for figure drawing, that is, all scanning lines from the uppermost scanning line to the lowermost scanning line, has been completed. If it has not been completed, then the processes in and after step S2 are repeated. If it has been completed, then the process of updating stencil buffer pixel data as a result of drawing a triangle is terminated.

The operation of the graphics LSI illustrated in FIGS. 35A and 35 B and the process according to the flowchart of the drawing process illustrated in FIGS. 36A and 36B are described below further in detail using practical examples of the operations illustrated in FIGS. 37 through 44. The path of the process of the data from the stencil buffer, the write-back data, and the process flowchart in FIGS. 36A and 36B corresponding to the operation examples is described below with reference to the example of pixel paint data transit in FIGS. 45A and 45B.

There are 20 practical examples of operations (1) through (20), and the explanation is redundant if all of these examples are described. Therefore, some characteristic examples in the 20 operation examples are selected and described below.

Figure 37:
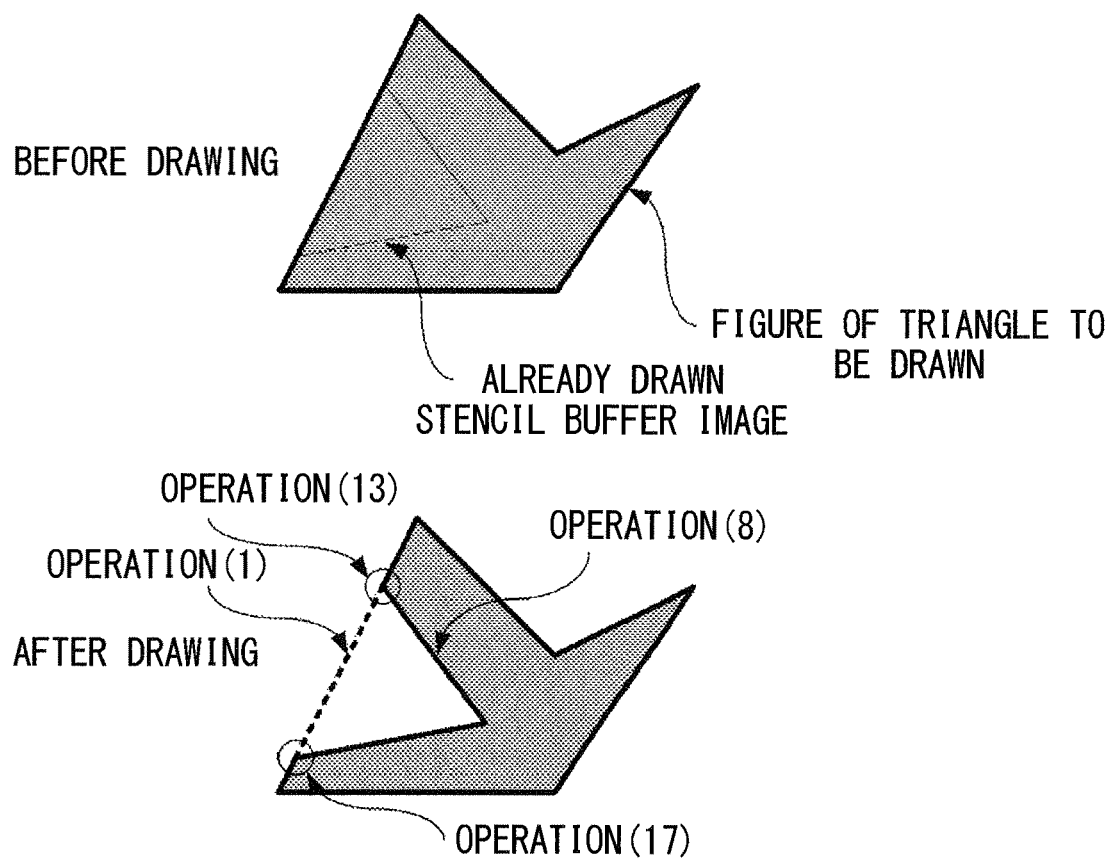
FIG. 37 is an explanatory view of a new triangle drawing process (1) on a stencil buffer image.

First, in the operation (1) illustrated in FIG. 37, when a new triangle is drawn for the already drawn stencil buffer image, it is not necessary to paint the leftmost pixel of the newly drawn triangle, and it is natural that the corresponding boundary in the already drawn stencil buffer image is to be erased.

In the uppermost row in FIG. 45A, it is assumed that the five pieces of data stored in the stencil buffer are "00_1_11". The "1" of the data indicates painting, and the "0" indicates erasure. The "1" enclosed by "_" indicates the pixel of the contour of the triangle or the pixel of the painted boundary of the already drawn stencil buffer image.

The data of the continuous pixels is configured by 5 pixels for convenience in explanation, and the 2-pixel data is sequentially read from the stencil buffer 70 and processed as described above. If the values of the second and third pixels from the leftmost, that is, "01", are read, the boundary has been reached. The third pixel value "1" is the data of the leftmost pixel of the span to be excluded from the triangle to be drawn. Since the 2-pixel values are "01", the paths 2 and 11 are traced in step S5 and the path 26 is traced in step S6 in the process flowchart illustrated in FIGS. 36A and 36B, the data of the pixels after the "1" is inverted as is, and the data written back to the stencil buffer is "00_0_00". It is natural that the write-back data matches the result of the prior art in which the drawn image data is inverted as is on and after the boundary.

Figure 38:
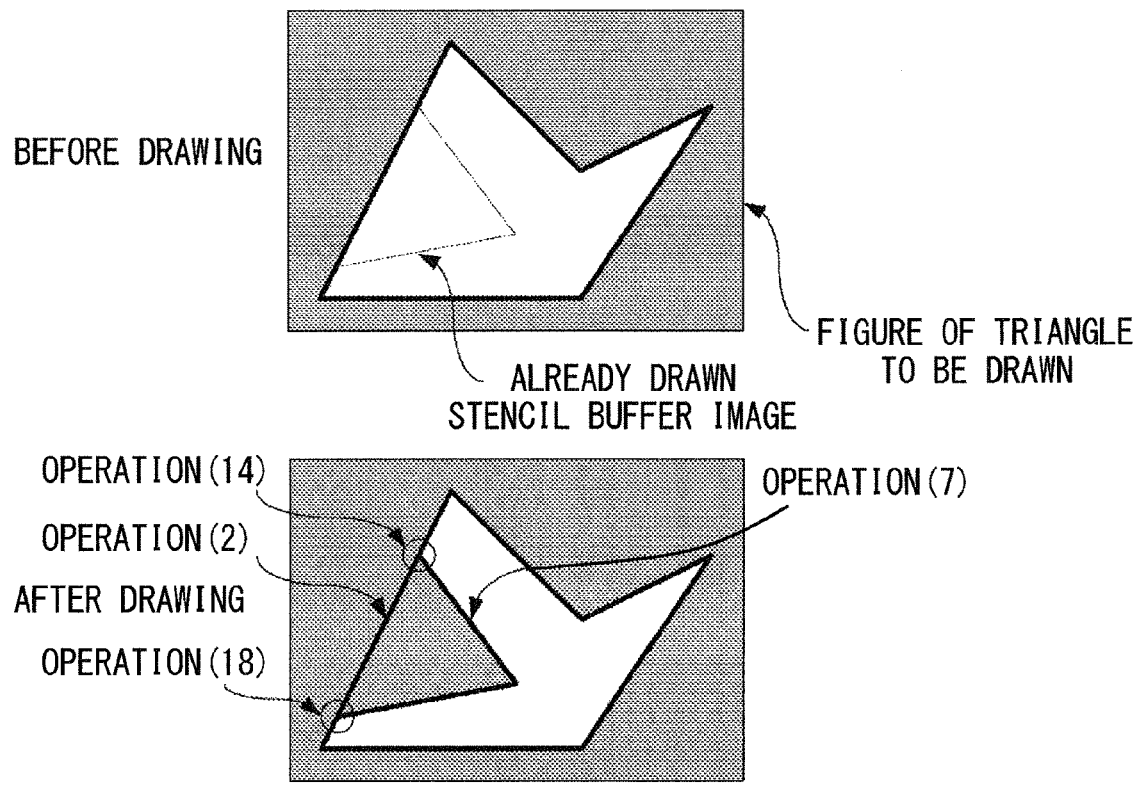
FIG. 38 is an explanatory view of a new triangle drawing process (2)
Figure 39:
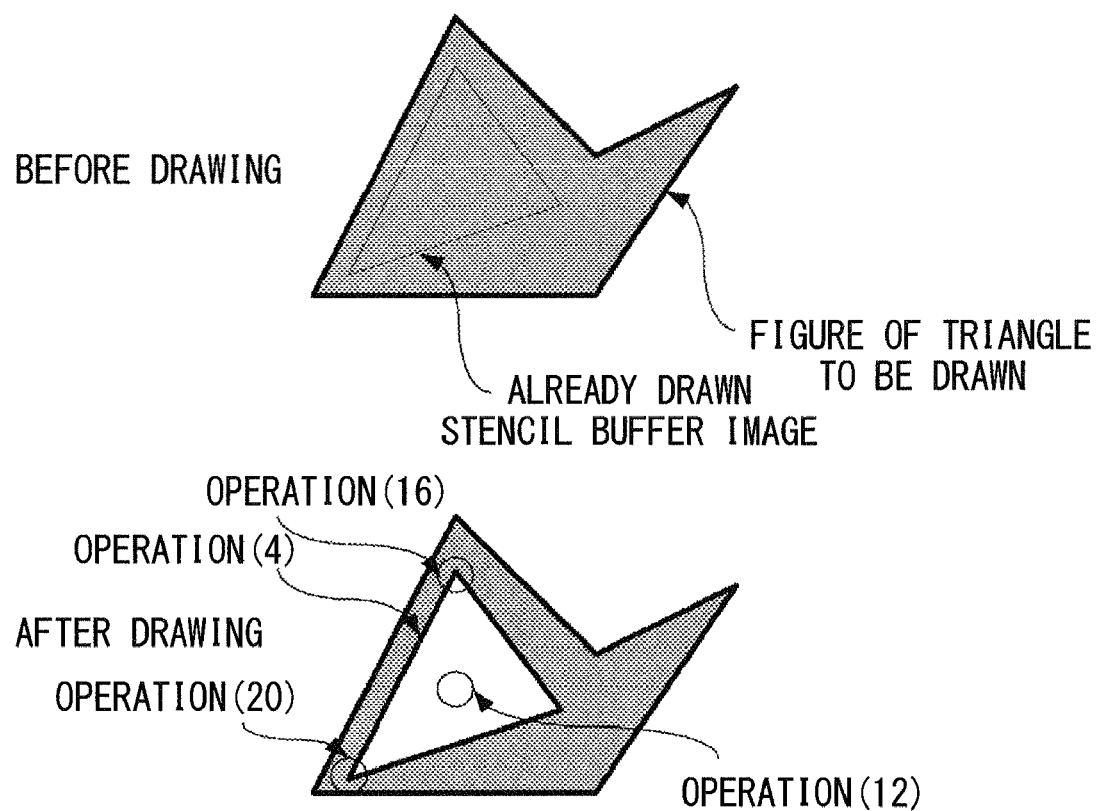
FIG. 39 is an explanatory view of a new triangle drawing process (3)

The operation (2) in FIG. 38 is described below. In FIG. 38, the 5-pixel data near the left side of the triangle to be drawn is, for FIG. 38, "11_1_00". The contour of the triangle in this case, that is, the position of the left side is the leftmost of the span. The 2-pixel data that is changed by reaching the leftmost of the span if "10", and the paths 2 and 12 are traced in step S5 as illustrated in the row of the second scene in FIG. 45B. Then, through the path 27, the pixel inversion boundary is delayed by one pixel in step S6. That is, control is shifted to the right.

After all, in the prior art, it is necessary to invert the right data including the left pixel in the 2-pixel data "10". By inverting the pixel data from the right pixel having the data "0", the pixel inversion boundary is delayed by one pixel between the left pixel and the right pixel, thereby obtaining the write-back data of "11_1_11" to the stencil buffer. On the other hand, in the prior art, the write-back data to the stencil buffer is "11_0_11".

In FIGS. 35A and 35B, the pixel drawing effecter 77 performs the operation of delaying the pixel inversion boundary by one pixel. Then, the pixel inversion boundary phase selector 79 provides the pixel inversion boundary control unit 80 with a value indicating that the inversion boundary is to be delayed, for example, "−1". In response to the value, the pixel inversion boundary control unit 80 controls the switch of the selector 90, thereby delaying the pixel inversion boundary by one pixel.

In this case, the 2-pixel data "10" is inverted by the logical unit 76, and provided as "01" for the pixel drawing effecter 77. In response to the input of the value "0" corresponding to the left pixel, the selector 90 is switched to the FF 87, and the data "1" stored in the FF 87 is shifted to the FF 89 in the next cycle. In response to the input of the data "1" of the right pixel, the selector 90 is switched to the FF 88. As a result, "11" is written back as resultant 2-pixel data to the stencil buffer 70.

Figure 41:
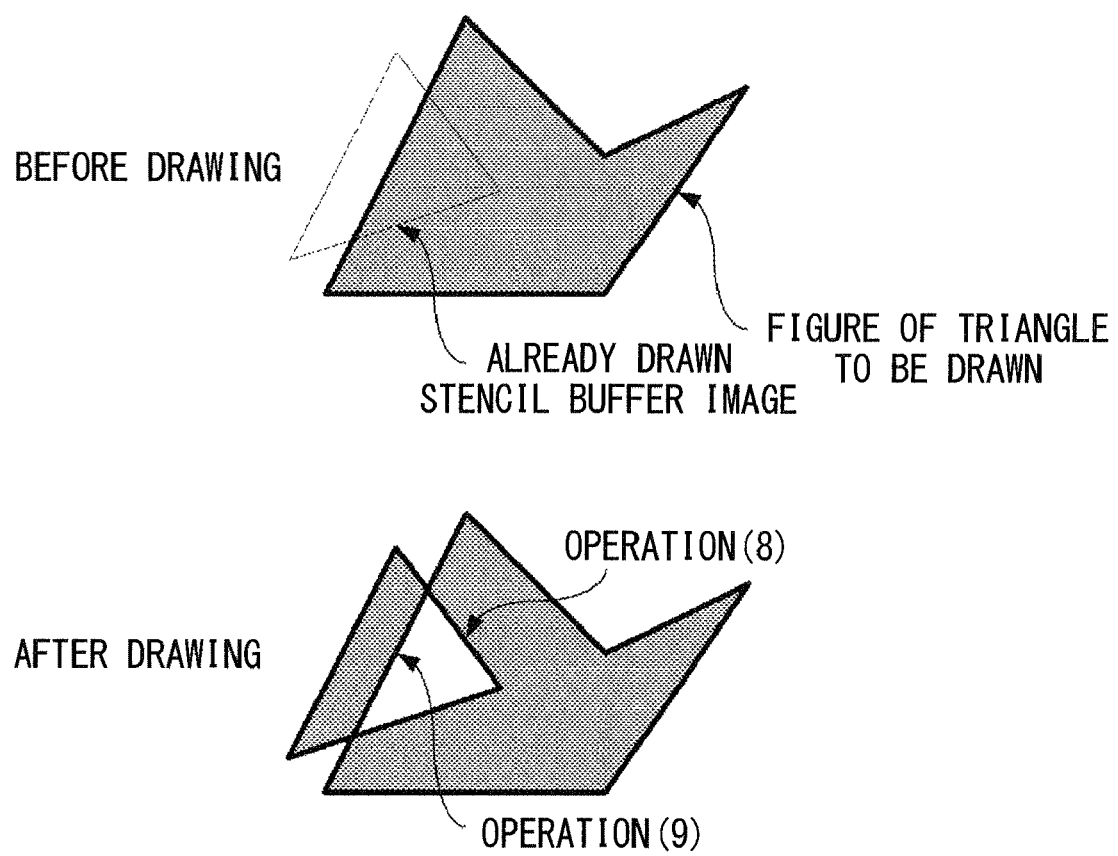
FIG. 41 is an explanatory view of a new triangle drawing process (5)
Figure 42:
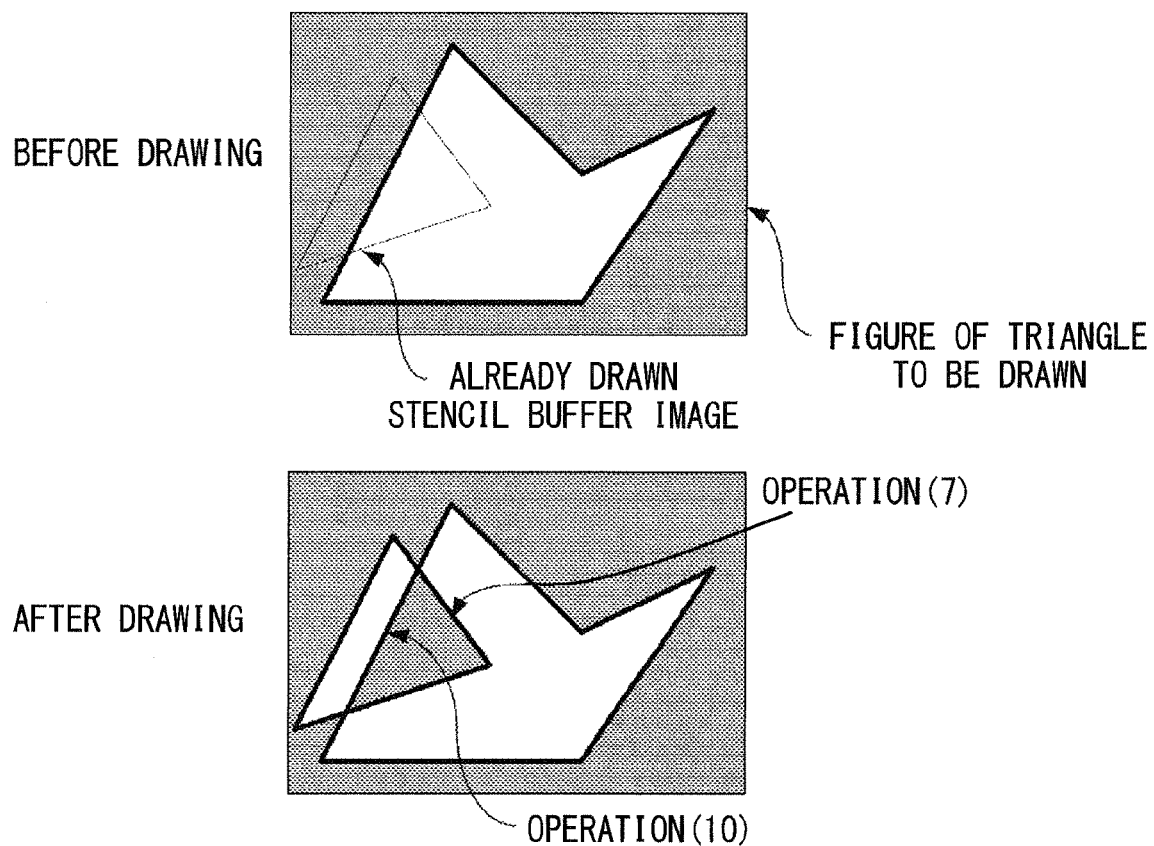
FIG. 42 is an explanatory view of a new triangle drawing process (6)

Next, the operation (9) in FIG. 41 is described. In this operation, the contour of the stencil buffer image is included in the triangle to be drawn. In FIGS. 45A and 45B, the five pieces of pixel data stored in the stencil buffer is "00_1_11".

In step S5 in the flowchart illustrated in FIGS. 36A and 36B, the paths 3 and 15 are traced. In step S6, the operation of delaying the pixel inversion boundary by one pixel is performed through the path 27. That is, as in the prior art, if all the data of the five pixels is inverted, the contour of the stencil buffer image is erased. Therefore, the data of "11_1_1_00" is written back to the stencil buffer, thereby performing the operation of moving the inversion boundary to the point between the current position and the right pixel.

Described next is the operation (13) in FIG. 37. In this operation, the uppermost vertex of the triangle to be drawn belongs to the uppermost scanning line, and the operation of not erasing the vertex is required. The data in the stencil buffer is "00__1__11".

In FIGS. 36A and 36B, since the vertex belongs to the uppermost scanning line, the paths 1 and 7 are traced in step S5, and the operation of excluding the vertex from the pixel inversion targets through the path 29 in step S6. That is, in the prior art, the pixel data corresponding to the vertex, that is, the pixel data "1" as the central pixel in the five pieces of data is inverted. However, since the inversion erases the vertex, the pixel data is not inverted, but the data read from the stencil buffer is bypassed by the path selector 75 in FIGS. 35A and 35B, and written back as is to the stencil buffer 70.

Next, the operation (14) in FIG. 38 is described. As compared with FIG. 37, the already drawn stencil buffer image itself is inverted, and the operation of drawing the same triangle as in FIG. 37 is performed. In this operation, it is necessary to prevent the same vertex from being erased.

If the data in the stencil buffer is "11__1__00", the paths 1 and 8 are traced in step S5 in FIGS. 36A and 36B. In step S6, the operation of excluding the data from the pixel inversion target through the path 29 is performed, and the inversion is not performed on the contour of the stencil buffer image, that is, on the third piece of the pixel data, thereby maintaining the value of "1".

Described next is the operation (18) in FIG. 38. The difference from the operation (14) above is that the lowermost vertex of the triangle to be drawn is on the contour of the stencil buffer image. If the data in the stencil buffer is "11__1__00", the paths 5 and 24 are traced in step S5 in FIGS. 36A and 36B. In step S6, the operation of excluding the data from the pixel inversion target through the path 29 is performed as in the operation (14).

Described finally is the operation (19) in FIG. 40. This operation is performed when the lowermost vertex of the triangle to be drawn is in the erasure area of the still image. If the data in the stencil buffer is "00__0__00", the paths 5 and 22 are traced in step S5 in FIGS. 35A and 35B. In step S6, the inversion result by the logical unit 76 on the pixel data corresponding to the vertex is written back as is to the stencil buffer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A figure drawing device which draws a figure by painting pixels on a scanning line, comprising:
at least one processor to perform:
painted pixel increase/decrease control to increase or decrease a number of painting pixels up to a final painting pixel on the scanning line by one pixel;
scanning line increase/decrease control to increase or decrease a number of scanning lines to draw a figure by one scanning line; and
pixel data output to output pixel data to draw a figure on a basis of control of the painted pixel increase/decrease control and the scanning line increase/decrease control;
a stencil buffer to hold pixel data of a figure in an intermediate stage of sequential drawing for a finally drawn figure;
the at least one processor to further perform:
consecutive pixel data holding to temporarily hold pixel data of a plurality of pixels consecutive on one scanning line and read from the stencil buffer;
pixel data transit state detection to detect a transit state between a painted state and unpainted state of a pixel held in the consecutive pixel data holding; and
pixel data write to perform a logical operation of pixel data output by the drawing data output to draw a new figure in the sequential drawing process and pixel data held in the consecutive pixel data holding, and to perform inversion or non-inversion on the logical operation result depending on data transit state detected by the pixel data transit state detection, thereby to write back data to the stencil buffer.

2. A figure drawing device which draws a figure by painting pixels on a scanning line, comprising:
at least one processor to perform:
painted pixel increase/decrease control to increase or decrease a number of painting pixels up to a final painting pixel on the scanning line by one pixel;
scanning line increase/decrease control to increase or decrease a number of scanning lines to draw a figure by one scanning line; and
pixel data output to output pixel data to draw a figure on a basis of control of the painted pixel increase/decrease control and the scanning line increase/decrease control;
a stencil buffer to hold pixel data of a figure in an intermediate stage of sequential drawing for a finally drawn figure;
the at least one processor to further perform:
consecutive pixel data holding to temporarily hold pixel data of a plurality of pixels consecutive on one scanning line and read from the stencil buffer;
pixel data transit state detection to detect a transit state between a painted state and unpainted state of a pixel held in the consecutive pixel data holding; and
pixel data writing to write back pixel data held in the consecutive pixel data holding as is to the stencil buffer depending on a detection result of the pixel data transit state detection when the scanning line is an uppermost or lowermost scanning line of the figure to be drawn.

3. The device according to claim 2, wherein:
the pixel data held in the consecutive pixel data holding is 2-pixel data of two consecutive pixels;
when the pixel data transit state detection detects that the pixel data of at least one of the two pixels indicates a value of a pasted state, the pixel data write writes back the pixel data held in the consecutive pixel data holding as is to the stencil buffer.

4. A figure drawing method for drawing a figure by painting pixels on a scanning line, comprising:
determining whether a number of painting pixels up to a final painting pixel on the scanning line is increased or decreased by one pixel;
determining whether a number of scanning lines for drawing a figure is increased or decreased by one scanning line;
outputting pixel data for drawing a figure on a basis of an increase or decrease determination result of the number of painted pixels and an increase or decrease determination result of the number of scanning lines;
performing a logical operation on the output pixel data and pixel data of a plurality of pixels read from a stencil buffer to hold figure data of an intermediate stage to be sequentially drawn depending on a finally drawn figure, and consecutive on one scanning line; and writing back a result of the logical operation to the stencil buffer by inverting or non-inverting depending on a transit state between a painted state and an unpainted state of the plural pieces of consecutive pixel data.

* * * * *